US012667857B2

(12) United States Patent
Pamplin et al.

(10) Patent No.: US 12,667,857 B2
(45) **Date of Patent: \*Jun. 30, 2026**

(54) IDENTIFYING AND QUANTIFYING COMPONENTS IN A HIGH-MELTING-POINT LIQUID

(71) Applicant: Abilene Christian University, Abilene, TX (US)

(72) Inventors: Kim Pamplin, Abilene, TX (US); Tyler Cepica, Abilene, TX (US)

(73) Assignee: Abilene Christian University, Abilene, TX (US)

( \* ) Notice: Subject to any disclaimer, the term of this patent is extended or adjusted under 35 U.S.C. 154(b) by 266 days.

This patent is subject to a terminal disclaimer.

(21) Appl. No.: 18/441,546

(22) Filed: Feb. 14, 2024

(65) Prior Publication Data

US 2024/0246099 A1     Jul. 25, 2024

Related U.S. Application Data

(63) Continuation of application No. 17/091,697, filed on Nov. 6, 2020, now Pat. No. 11,931,763.

(60) Provisional application No. 62/932,887, filed on Nov. 8, 2019.

(51) Int. Cl.
　　*B05B 7/16*　　　(2006.01)
　　*G01N 1/20*　　　(2006.01)

(52) U.S. Cl.
　　CPC ......... *B05B 7/1626* (2013.01); *G01N 1/2035* (2013.01); *G01N 2001/205* (2013.01)

(58) Field of Classification Search
　　CPC .... B05B 7/1626; G01N 1/2035; G01N 21/74; H01J 49/0468; H01J 49/0477
　　See application file for complete search history.

(56) References Cited

U.S. PATENT DOCUMENTS

| | | |
|---|---|---|
| 3,521,959 A | 7/1970 | Fassel et al. |
| 4,005,178 A | 1/1977 | LeBlanc |
| 4,539,846 A | 9/1985 | Grossman |
| (Continued) | | |

FOREIGN PATENT DOCUMENTS

| | | |
|---|---|---|
| CA | 3179052 | 11/2021 |
| CN | 102795601 | 11/2012 |
| (Continued) | | |

OTHER PUBLICATIONS

McFarlane et al, "Fission Product Volatility and Off-Gas Systems for Molten Salt Reactors", US Department of Energy, Sep. 3, 2019 (Year: 2019).\*

(Continued)

*Primary Examiner* — David E Smith
(74) *Attorney, Agent, or Firm* — King & Spalding

(57) ABSTRACT

Apparatus, systems, and methods for identifying and quantifying chemical components in a high-melting-point liquid. One such method includes: receiving, into a nebulizer assembly, a high-melting-point liquid from a molten liquid conduit; aerosolizing, using the nebulizer assembly, at least a portion of the received high-melting-point liquid; delivering, into one or more instruments, the aerosolized high-melting-point liquid from the nebulizer; and chemically analyzing, using the one or more instruments, the aerosolized high-melting-point liquid.

11 Claims, 13 Drawing Sheets

(56) References Cited

U.S. PATENT DOCUMENTS

| | | | |
|---|---|---|---|
| 4,783,997 | A | 11/1988 | Lynnworth |
| 6,125,912 | A | 10/2000 | Branagan et al. |
| 6,143,431 | A | 11/2000 | Webster |
| 6,258,185 | B1 | 7/2001 | Branagan et al. |
| 6,318,192 | B1 | 11/2001 | Carbone |
| 6,490,927 | B2 | 12/2002 | Braunling et al. |
| 6,699,455 | B2 | 3/2004 | Bulan et al. |
| 6,710,335 | B2 | 3/2004 | Ellson et al. |
| 6,841,140 | B2 | 1/2005 | Nishmimura et al. |
| 6,983,654 | B2 | 1/2006 | Balin |
| 7,011,736 | B1 | 3/2006 | Miller et al. |
| 7,322,251 | B2 | 1/2008 | Gysling et al. |
| 7,960,581 | B2 | 6/2011 | Vreede et al. |
| 8,636,892 | B2 | 1/2014 | Koehl et al. |
| 8,642,954 | B2 | 2/2014 | Ivaldi et al. |
| 8,746,440 | B2 | 6/2014 | Williamson et al. |
| 8,771,482 | B2 | 7/2014 | Bailey et al. |
| 8,900,439 | B2 | 12/2014 | Wiedmeyer et al. |
| 8,956,524 | B2 | 2/2015 | Wiedmeyer et al. |
| 8,968,547 | B2 | 3/2015 | Loewen et al. |
| 9,017,527 | B2 | 4/2015 | Wiedmeyer et al. |
| 9,150,975 | B2 | 10/2015 | Berger et al. |
| 9,287,099 | B2 | 3/2016 | Otsuka et al. |
| 9,295,923 | B2 | 3/2016 | Mezheritsky et al. |
| 9,299,464 | B2 | 3/2016 | Venneri |
| 9,305,673 | B2 | 4/2016 | Heinold et al. |
| 9,347,807 | B2 | 5/2016 | Ao |
| 9,475,706 | B2 | 10/2016 | Policke et al. |
| 9,620,248 | B2 | 4/2017 | Venneri |
| 9,638,607 | B1 | 5/2017 | Hawthorne et al. |
| 9,847,149 | B2 | 12/2017 | Spoerke et al. |
| 9,941,025 | B2 | 4/2018 | Ahlfeld et al. |
| 9,968,899 | B1 | 5/2018 | Gellaboina |
| 10,032,528 | B2 | 7/2018 | Venneri |
| 10,056,160 | B2 | 8/2018 | LeBlanc |
| 10,109,378 | B2 | 10/2018 | Snead |
| 10,109,382 | B2 | 10/2018 | Hackett et al. |
| 10,141,079 | B2 | 11/2018 | Czerwinski et al. |
| 10,221,499 | B2 | 3/2019 | Miller et al. |
| 10,280,527 | B2 | 5/2019 | Loewen et al. |
| 10,317,262 | B2 | 6/2019 | Kippersund |
| 10,416,045 | B2 | 9/2019 | Launiere et al. |
| 10,438,705 | B2 | 10/2019 | Cheatham, III |
| 10,475,543 | B2 | 11/2019 | Venneri |
| 10,566,096 | B2 | 2/2020 | Czerwinski |
| 10,573,416 | B2 | 2/2020 | Venneri |
| 10,685,750 | B2 | 6/2020 | Eichel et al. |
| 10,830,689 | B2 | 11/2020 | Hedtke |
| 10,878,971 | B2 | 12/2020 | Venneri |
| 11,101,048 | B2 | 8/2021 | Venneri |
| 11,136,245 | B2 | 10/2021 | Benson |
| 11,170,901 | B2 | 11/2021 | Cheatham, III |
| 11,189,383 | B2 | 11/2021 | Snead |
| 11,200,991 | B2 | 12/2021 | LeBlanc |
| 11,226,281 | B1 | 1/2022 | Findikoglu et al. |
| 11,276,503 | B2 | 3/2022 | Cisneros |
| 11,286,172 | B2 | 3/2022 | Russell et al. |
| 11,373,765 | B2 | 6/2022 | Czerwinski |
| 11,459,662 | B2 | 10/2022 | Murahara |
| 11,501,883 | B2 | 11/2022 | Eichel et al. |
| 2004/0093957 | A1 | 5/2004 | Griffin et al. |
| 2006/0000071 | A1 | 1/2006 | Lin |
| 2009/0046825 | A1 | 2/2009 | Dulka et al. |
| 2012/0302811 | A1 | 11/2012 | Long |
| 2013/0264222 | A1* | 10/2013 | Bae .................... G01N 27/4118 |
| | | | 204/406 |
| 2015/0040727 | A1 | 2/2015 | Kosslow |
| 2015/0107371 | A1 | 4/2015 | Khrakovsky |
| 2015/0310948 | A1 | 10/2015 | Venneri |
| 2016/0189812 | A1 | 6/2016 | Czerwinski |
| 2016/0189813 | A1 | 6/2016 | Cisneros, Jr. |
| 2016/0217874 | A1 | 7/2016 | Dewan et al. |
| 2016/0363528 | A1* | 12/2016 | Lou ........................ G01N 21/72 |
| 2017/0045423 | A1* | 2/2017 | Launiere .............. G01N 23/223 |
| 2017/0271033 | A1 | 9/2017 | Dodson et al. |

| | | | |
|---|---|---|---|
| 2017/0292179 | A1 | 10/2017 | Hackett |
| 2017/0294241 | A1 | 10/2017 | Dodson et al. |
| 2017/0294242 | A1 | 10/2017 | Simpson et al. |
| 2017/0301413 | A1 | 10/2017 | Cisneros, Jr. |
| 2017/0301418 | A1 | 10/2017 | Dodson et al. |
| 2018/0254109 | A1 | 9/2018 | Cheatham, III et al. |
| 2018/0327305 | A1* | 11/2018 | Amin ..................... C03C 3/097 |
| 2019/0015806 | A1 | 1/2019 | Gellaboina |
| 2019/0057783 | A1 | 2/2019 | LeBlanc |
| 2019/0139665 | A1 | 5/2019 | Czerwinski et al. |
| 2019/0371482 | A1 | 12/2019 | Benson |
| 2020/0087156 | A1 | 3/2020 | Kelleher |
| 2020/0122109 | A1 | 4/2020 | Kruizenga et al. |
| 2020/0161015 | A1 | 5/2020 | Czerwinski et al. |
| 2020/0180975 | A1 | 6/2020 | Benson |
| 2021/0130181 | A1 | 5/2021 | Brown et al. |
| 2021/0210235 | A1 | 7/2021 | Venneri |
| 2022/0005617 | A1 | 1/2022 | Snead |
| 2022/0051818 | A1 | 2/2022 | Cisneros, Jr. |
| 2022/0139577 | A1 | 5/2022 | Cisneros, Jr. et al. |
| 2022/0139578 | A1 | 5/2022 | Venneri et al. |
| 2022/0250936 | A1 | 8/2022 | Benson |
| 2022/0390334 | A1 | 12/2022 | Jorgensen |
| 2023/0104365 | A1 | 4/2023 | Eichel et al. |
| 2024/0167919 | A1 | 5/2024 | Biegalski |
| 2024/0192123 | A1 | 6/2024 | Robison |

FOREIGN PATENT DOCUMENTS

| | | | |
|---|---|---|---|
| CN | 203080087 | U | 7/2013 |
| CN | 102967494 | B | 4/2015 |
| CN | 103714371 | B | 5/2016 |
| CN | 104090004 | B | 5/2016 |
| CN | 106128533 | A | 11/2016 |
| CN | 106283112 | A | 1/2017 |
| CN | 106425315 | A | 2/2017 |
| CN | 107230506 | A | 10/2017 |
| CN | 106158053 | B | 11/2017 |
| CN | 107344726 | A | 11/2017 |
| CN | 106180254 | B | 6/2018 |
| CN | 108172318 | A | 6/2018 |
| CN | 108389634 | A | 8/2018 |
| CN | 109141969 | A | 1/2019 |
| CN | 109207128 | A | 1/2019 |
| CN | 105838339 | B | 3/2019 |
| CN | 109509562 | A | 3/2019 |
| CN | 106621429 | B | 4/2019 |
| CN | 106840765 | A | 4/2019 |
| CN | 109671510 | A | 4/2019 |
| CN | 106902526 | B | 6/2019 |
| CN | 106477618 | B | 7/2019 |
| CN | 110042434 | A | 7/2019 |
| CN | 105420737 | B | 9/2019 |
| CN | 105463306 | B | 9/2019 |
| CN | 106221678 | B | 9/2019 |
| CN | 108179432 | B | 9/2019 |
| CN | 110194494 | A | 9/2019 |
| CN | 107469628 | B | 10/2019 |
| CN | 108109710 | B | 10/2019 |
| CN | 209496626 | U | 10/2019 |
| CN | 108231224 | B | 12/2019 |
| CN | 108511089 | B | 12/2019 |
| CN | 106517097 | B | 2/2020 |
| CN | 110783010 | A | 2/2020 |
| CN | 210803355 | U | 6/2020 |
| CN | 108956744 | B | 7/2020 |
| CN | 109637682 | B | 9/2020 |
| CN | 106957636 | B | 10/2020 |
| CN | 110203886 | B | 10/2020 |
| CN | 109011696 | B | 12/2020 |
| CN | 112062567 | A | 12/2020 |
| CN | 112111251 | A | 12/2020 |
| CN | 112284170 | A | 1/2021 |
| CN | 112322939 | A | 2/2021 |
| CN | 112357885 | A | 2/2021 |
| CN | 108956443 | B | 3/2021 |
| CN | 109097001 | B | 3/2021 |
| CN | 110689984 | B | 3/2021 |
| CN | 109231241 | B | 4/2021 |

(56) References Cited

FOREIGN PATENT DOCUMENTS

| | | | |
|---|---|---|---|
| CN | 110444311 | B | 5/2021 |
| CN | 112778012 | A | 5/2021 |
| CN | 108088813 | B | 6/2021 |
| CN | 112946046 | A | 6/2021 |
| CN | 113174240 | A | 7/2021 |
| CN | 213707743 | U | 7/2021 |
| CN | 109680282 | B | 9/2021 |
| CN | 113372886 | A | 9/2021 |
| CN | 112391653 | B | 11/2021 |
| CN | 113630582 | A | 11/2021 |
| CN | 111334258 | B | 12/2021 |
| CN | 113860350 | A | 12/2021 |
| CN | 111627571 | B | 2/2022 |
| CN | 112125281 | B | 2/2022 |
| CN | 114086111 | A | 2/2022 |
| CN | 215770541 | U | 2/2022 |
| CN | 112695229 | B | 3/2022 |
| CN | 112429772 | B | 5/2022 |
| CN | 112479256 | B | 5/2022 |
| CN | 111141670 | B | 6/2022 |
| CN | 111627569 | B | 7/2022 |
| CN | 114813222 | A | 7/2022 |
| CN | 112530614 | B | 8/2022 |
| CN | 112700895 | B | 8/2022 |
| CN | 114842989 | A | 8/2022 |
| CN | 112151197 | B | 9/2022 |
| CN | 112891973 | B | 9/2022 |
| CN | 113044378 | B | 9/2022 |
| CN | 114288837 | B | 9/2022 |
| CN | 217405118 | U | 9/2022 |
| CN | 112551567 | B | 11/2022 |
| CN | 112992389 | B | 11/2022 |
| CN | 113603059 | B | 11/2022 |
| CN | 112587989 | B | 12/2022 |
| CN | 112863725 | B | 12/2022 |
| CN | 112863726 | B | 12/2022 |
| CN | 113241200 | B | 12/2022 |
| JP | 2002147695 | | 5/2002 |
| KR | 10-2021-0008784 | | 1/2002 |
| WO | WO 2015017928 | | 2/2015 |
| WO | WO 2015094450 | | 10/2015 |
| WO | WO 2017019620 | | 2/2017 |
| WO | WO 2017032379 | | 3/2017 |
| WO | WO 2017106509 | | 6/2017 |
| WO | WO 2017171937 | | 10/2017 |
| WO | WO 2017172177 | | 10/2017 |
| WO | WO 2017172948 | | 10/2017 |
| WO | WO 2017192611 | | 11/2017 |
| WO | WO 2017199059 | | 2/2018 |
| WO | WO 2018026536 | | 2/2018 |
| WO | WO 2018027170 | | 2/2018 |
| WO | WO 2018031148 | | 2/2018 |
| WO | WO 2018031681 | | 2/2018 |
| WO | WO 2018052529 | | 3/2018 |
| WO | WO 2018064572 | | 4/2018 |
| WO | WO 2018169588 | | 10/2018 |
| WO | WO 2018213669 | | 1/2019 |
| WO | WO 2019231971 | | 1/2020 |
| WO | WO 2020123513 | | 8/2020 |
| WO | WO 2022006169 | | 1/2022 |
| WO | WO 2022076084 | | 6/2022 |
| WO | WO 2022146446 | | 7/2022 |

OTHER PUBLICATIONS

Hoyt, N. et al. "Online Monitoring of Molten Salt Reactors," Argonne National Laboratory (2019).

Hoffman, "Fudamentals of Ultrasonic-Flow Measurements for Industrial Applications," Krohne Messtechnik Gmbh & Co. KG Duisburg, 2000, 31 pages.

A sampling device for molten-salt systems' (McDonald et al), Mar. 7, 1960 (Mar. 7, 1960). [online, retrieved from <URL:https:l/www.ostl.gov/servlets/purl/4187309>.

Operation of the Sampler Enricher In the Molten Salt Reactor Experiment {Gallaher}, Oct. 2, 1971 (Oct. 2, 1971), (online], retrieved from https://www.osti.gov/servlets/purl/4731130.

Blain R. Lancaster, High Resolution Distributed Temperature Measurements Using Optical Fibers In A Molten Salt Forced Convection Environment, Texas A&M University, pp. 1-53 (Year: 2021).

Harkema et al. Development and Demonstration of a Prototype Molten Salt Sampling Sys-tem. Idaho National Laboratory [online]. Jan. 2023.

Mcfarlane et al. Fission Product Volatility and Off-Gas Systems for Molten Salt Reactors. US De-partment of Energy, Sep. 3, 2019.

* cited by examiner

FROM INTERFACE
APPARATUS 140

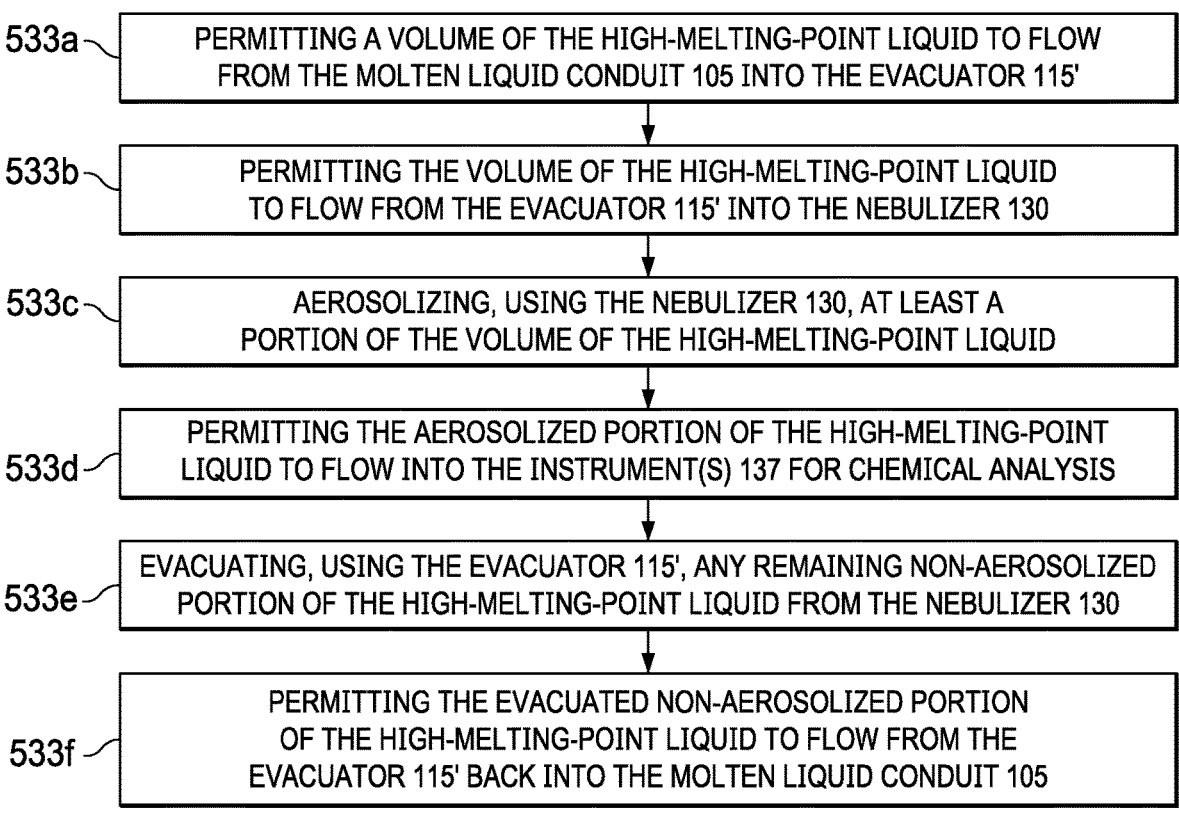

532

533a — PERMITTING A VOLUME OF THE HIGH-MELTING-POINT LIQUID TO FLOW FROM THE MOLTEN LIQUID CONDUIT 105 INTO THE EVACUATOR 115'

533b — PERMITTING THE VOLUME OF THE HIGH-MELTING-POINT LIQUID TO FLOW FROM THE EVACUATOR 115' INTO THE NEBULIZER 130

533c — AEROSOLIZING, USING THE NEBULIZER 130, AT LEAST A PORTION OF THE VOLUME OF THE HIGH-MELTING-POINT LIQUID

533d — PERMITTING THE AEROSOLIZED PORTION OF THE HIGH-MELTING-POINT LIQUID TO FLOW INTO THE INSTRUMENT(S) 137 FOR CHEMICAL ANALYSIS

533e — EVACUATING, USING THE EVACUATOR 115', ANY REMAINING NON-AEROSOLIZED PORTION OF THE HIGH-MELTING-POINT LIQUID FROM THE NEBULIZER 130

533f — PERMITTING THE EVACUATED NON-AEROSOLIZED PORTION OF THE HIGH-MELTING-POINT LIQUID TO FLOW FROM THE EVACUATOR 115' BACK INTO THE MOLTEN LIQUID CONDUIT 105

FIG. 10

IDENTIFYING AND QUANTIFYING COMPONENTS IN A HIGH-MELTING-POINT LIQUID

CROSS-REFERENCE TO RELATED APPLICATION

This application is a continuation of U.S. patent application Ser. No. 17/091,697, filed Nov. 6, 2020, which claims priority to U.S. Patent Application No. 62/932,887, filed Nov. 8, 2019, the entire disclosures of which are hereby incorporated herein by reference.

TECHNICAL FIELD

The present application relates generally to systems that process high-melting-point liquids, and, more particularly, to a system for identifying and quantifying chemical components in a high-melting-point liquid.

BACKGROUND

Corrosion of metal parts in a molten salt conduit containing a molten salt flow may be caused by water ($H_2O$), oxygen ($O_2$), and/or other impurities in the molten salt. Corrosion rates depend on the level(s) of impurities in the molten salt. Accordingly, progress towards a working nuclear reactor that utilizes a high-melting point liquid (e.g., molten salt) must be supported by the ability to identify and quantify potentially corrosive components (e.g., chemical components) in the high-melting point liquid.

BRIEF DESCRIPTION OF THE DRAWINGS

FIG. 10 is a flow diagram of a method for implementing one or more embodiments of the present disclosure.

DETAILED DESCRIPTION

Apparatus, systems, and methods for elemental analysis of a high-melting-point liquid are described herein. Such a high-melting-point liquid may be or include molten salt, molten sodium, molten lead, the like, or any combination thereof. Specifically, the present disclosure facilitates real-time identification and quantification of components in the high-melting-point liquid, which is a critical step in achieving regulatory approval for a nuclear reactor utilizing the high-melting-point liquid (e.g., the molten salt). Corrosion of metal parts in contact with a molten salt flow may be caused by water ($H_2O$), oxygen ($O_2$), and/or other impurities in the molten salt. The present disclosure enables operators to measure: the components in the high-melting-point liquid (e.g., molten salt); the concentration(s) of water ($H_2O$) and oxygen ($O_2$) in the molten salt; and/or other impurity levels in the high-melting-point liquid. Equipped with this information, among other things, operators are able to determine how certain metals (e.g., alloys) behave when in contact with the high-melting-point liquid (with and without impurities), and prevent, or at least reduce, corrosion by monitoring and setting alarms for any situation in which the concentrations of the impurities and/or other components in the high-melting-point liquid stray outside of safe operating levels.

Figure 1A:
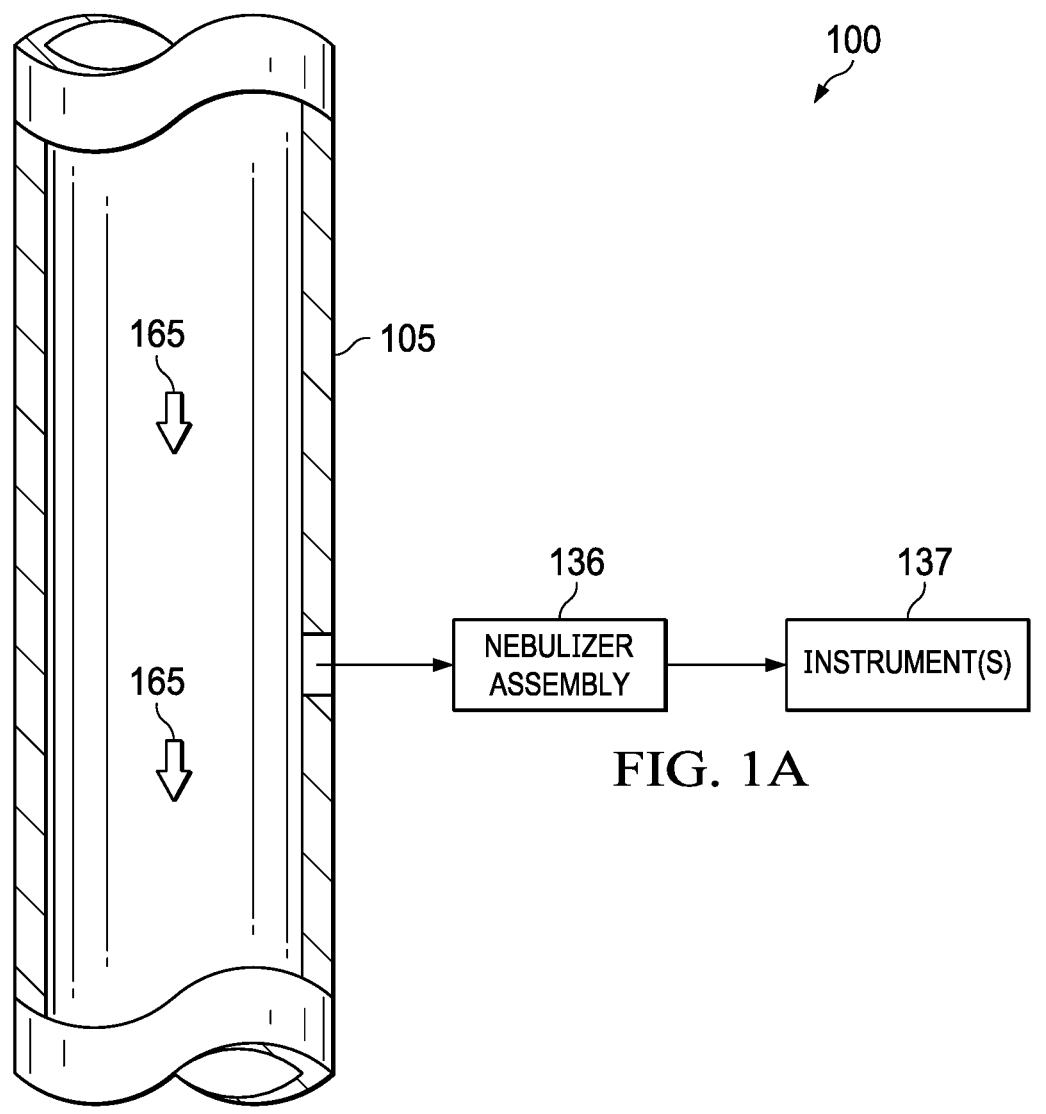
FIG. 1A is a schematic diagram of a system for identifying and quantifying components (e.g., chemical components) in a high-melting-point-liquid, the system including a molten liquid conduit, a nebulizer assembly, and instrument(s) according to one or more embodiments of the present disclosure.

FIG. 1A is a schematic diagram of a system 100 for identifying and quantifying components in a high-melting-point liquid, according to one or more embodiments. Referring to FIG. 1A, the system 100 includes a molten liquid conduit 105, a nebulizer assembly 136, and instrument(s) 137. The molten liquid conduit 105 is configured to contain a high-melting-point liquid 165, as in FIG. 1A, and, in some embodiments, forms part of a molten salt loop associated with a nuclear reactor. The nebulizer assembly 136 is configured to receive a volume of the high-melting-point liquid 165 from the molten liquid conduit 105. The received volume of the high-melting-point liquid 165 is then aerosolized by the nebulizer assembly 136, as will be described in further detail below. The instrument(s) 137 are configured to receive the aerosolized portion of the high-melting-point liquid 165 from the nebulizer assembly 136. The instrument(s) 137 may be or include a variety of analytical instrumentation configured to receive the aerosolized volume of the high-melting-point liquid 165 from the nebulizer assembly 136 and to determine the chemical contents of the aerosolized high-melting-point liquid, as will be described in further detail below.

Figure 1B:
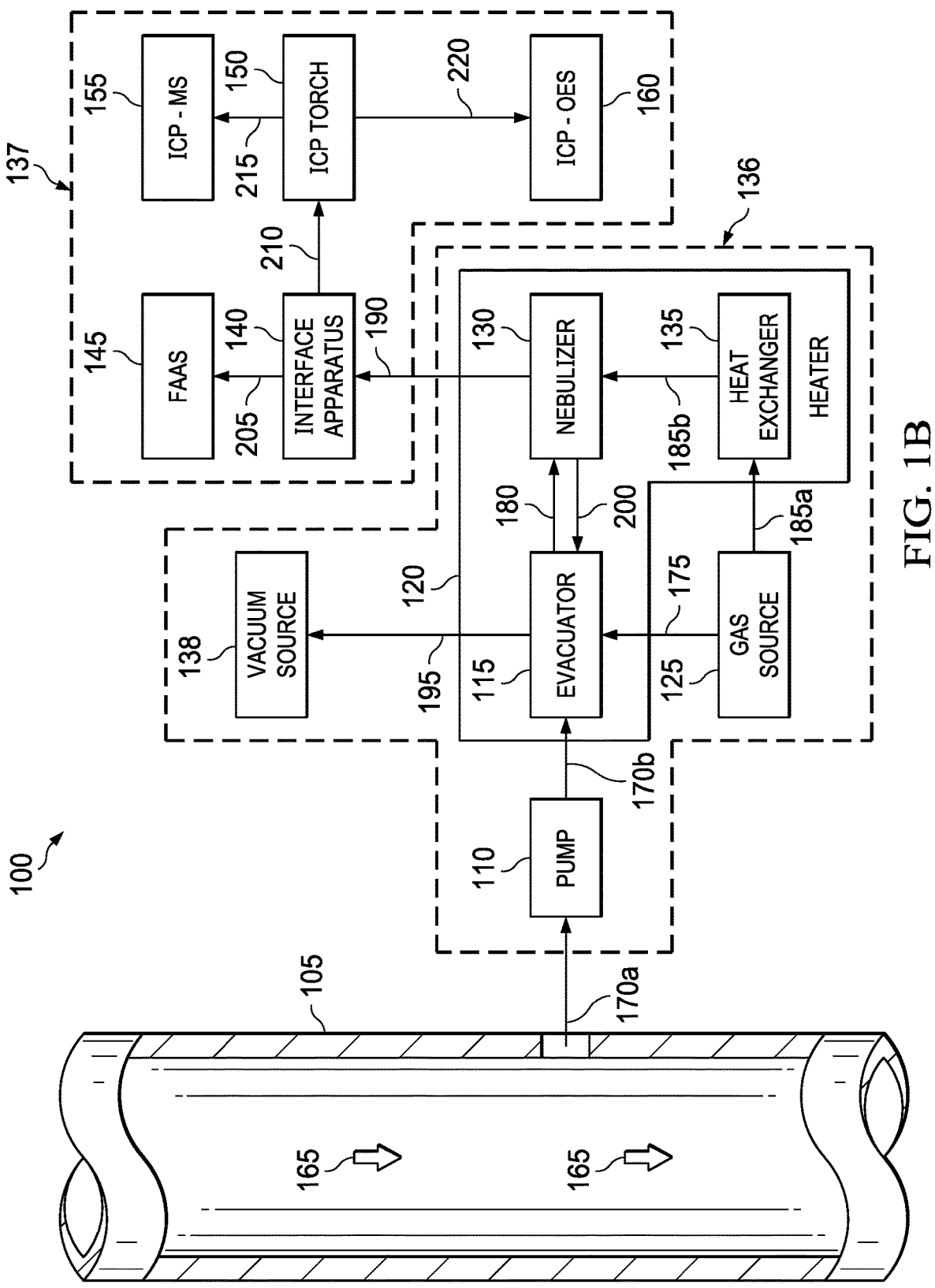
FIG. 1B is a schematic diagram of the system of FIG. 1A according to an embodiment.

Referring to FIG. 1B, with continuing reference to FIG. 1A, in an embodiment, the nebulizer assembly 136 includes a pump 110 (e.g., a reciprocating pump) and an evacuator 115. As described above, the molten liquid conduit 105 is configured to contain the high-melting-point liquid 165, as in FIG. 1B, and, in some embodiments, forms part of a molten salt loop associated with a nuclear reactor. The pump 110 is configured to communicate high-melting-point liquid from the molten liquid conduit 105 to the evacuator 115. The evacuator 115 is configured to receive the high-melting-point liquid from the pump 110. In some embodiments, the pump 110 is omitted and the evacuator 115 is configured to receive the high-melting-point liquid directly from the molten liquid conduit 105. In other embodiments, the pump 110 may be replaced by a valve (not shown) actuable to control flow of the high-melting-point liquid from the molten liquid conduit 105 to the evacuator 115. The nebulizer assembly 136 also includes a heater 120 such as, for example, a furnace, an oven, the like, or a combination thereof. The evacuator 115 is contained within the heater 120. The nebulizer assembly 136 also includes a gas source 125. The evacuator 115 is further configured to receive gas (e.g., argon) from the gas source 125. In response to the evacuator 115 receiving a volume of the high-melting-point liquid from the molten liquid conduit 105 and the gas (e.g., argon) from the gas source 125, the evacuator 115 is further configured to deliver the received volume of the high-melting-point liquid 165 into the nebulizer 130 using positive gas pressure.

The nebulizer assembly 136 also includes a nebulizer 130. The nebulizer 130 is contained within the heater 120. The evacuator 115 provides a connection between the molten liquid conduit 105 and the nebulizer 130. The nebulizer 130 is configured to receive the volume of the high-melting-point liquid 165 delivered from the evacuator 115. The nebulizer assembly 136 also includes a heat exchanger 135. The heat exchanger 135 is contained within the heater 120. The heater 120 is configured to heat the evacuator 115, the nebulizer 130, and the heat exchanger 135 to keep the high-melting-point liquid from freezing. As shown in FIG. 1B, the evacuator 115, the heater 120, the nebulizer 130, and the heat exchanger 135, in combination, are part of the nebulizer assembly 136. The nebulizer 130 is further configured to receive gas (e.g., argon) from the gas source 125 (or another gas source) via the heat exchanger 135. In response to the nebulizer 130 receiving the volume of the high-melting-point liquid 165 from the evacuator 115 and the gas (e.g., argon) from the gas source 125, the nebulizer 130 is configured to aerosolize the volume of the high-melting-point liquid 165. In addition to delivering the volume of the high-melting-point liquid 165 into the nebulizer 130 using positive gas pressure, the evacuator 115 can withdraw any remainder of the volume of the high-melting-point liquid 165 from the nebulizer 130 using decreased or negative gas pressure. In this regard, the nebulizer assembly 136 also includes a vacuum source 138 configured to apply this decreased or negative gas pressure to the evacuator 115. In some embodiments, the vacuum source 138 is, includes, is part of, or is otherwise combined or in communication with, the gas source 125. In response to the decreased or negative gas pressure applied to the evacuator 115 by the vacuum source 138, the evacuator 115 is further configured to withdraw any remainder of the volume of the high-melting-point liquid 165 from the nebulizer 130 and back into the evacuator 115. In those embodiments in which the pump 110 is omitted, the vacuum source 138 may be configured to draw the volume of the high-melting-point liquid 165 from the molten liquid conduit 105 into the evacuator 115.

Referring still to FIG. 1B, in an embodiment, the instrument(s) 137 include an interface apparatus 140 and a flame atomic absorption spectrometer ("FAAS") 145. The interface apparatus 140 extends between the nebulizer 130 and the FAAS 145 and is configured to communicate the aerosolized high-melting-point liquid from the nebulizer 130 to the FAAS 145. In some embodiments, the interface apparatus 140 includes one or more conduits, such as, for example, a metal tube extending from the nebulizer assembly 136 and a Tygon tube extending from the FAAS 145. The FAAS 145 is configured to identify and quantify element(s) in the aerosolized high-melting-point liquid. In addition, or instead, the instrument(s) 137 also include an inductively coupled plasma ("ICP") torch 150. The interface apparatus 140 (or another interface apparatus) extends between the nebulizer assembly 136 and the ICP torch 150 and is configured to communicate aerosolized high-melting-point liquid from the nebulizer assembly 136 to the ICP torch 150. The ICP torch 150 is configured to heat aerosolized high-melting-point liquid in a plasma causing the ICP torch 150 to emit electromagnetic radiation (e.g., in the visible, ultraviolet, and near-infrared ranges of the electromagnetic spectrum) and gas-phase atoms/ions. In one or more embodiments, as in FIG. 1B, the instrument(s) 137 also include an inductively coupled plasma mass spectrometer ("ICP-MS") 155. The ICP-MS 155 is configured to receive the gas-phase atoms/ions emitted from the plasma generated by the ICP torch 150. In some embodiments, the ICP-MS 155 is, includes, or is part of the ICP torch 150. The ICP-MS 155 is further configured to identify and quantify element(s) in the aerosolized high-melting-point liquid. In addition, or instead, the instrument(s) 137 can also include an inductively coupled plasma optical emission spectrometer ("ICP-OES") 160. The ICP-OES 160 is configured to receive the electromagnetic radiation emitted from the plasma generated by the ICP torch 150. In some embodiments, the ICP-OES 160 is, includes, or is part of the ICP torch 150. The ICP-OES 160 is further configured to identify and quantify particular element(s) in the aerosolized high-melting-point liquid.

In some embodiments, in addition to, or instead of, the interface apparatus 140, the FAAS 145, the ICP torch 150, the ICP-MS 155, and the ICP-OES 160, the instrument(s) 137 may be or include one or more other components, such as, for example, other analytical instrumentation configured to receive the aerosolized volume of the high-melting-point liquid 165 from the nebulizer assembly 136 and to determine the chemical contents of the aerosolized high-melting-point liquid.

In operation, the molten liquid conduit 105 contains a high-melting-point liquid 165. A volume of the high-melting-point liquid 165 is communicated from the molten liquid conduit 105 to the nebulizer assembly 136, more specifically to the evacuator 115, as indicated by arrows 170a-b. In addition to receiving the volume of the high-melting-point liquid 165 from the molten liquid conduit 105, as indicated by the arrow 170b, the evacuator 115 also receives gas (e.g., argon) from the gas source 125, as indicated by arrow 175. In response to the evacuator 115 receiving the volume of the high-melting-point liquid 165 from the molten liquid conduit 105 and receiving the gas (e.g., argon) from the gas source 125, the evacuator 115 discharges the received volume of the high-melting-point liquid 165 into the nebulizer 130, as indicated by arrow 180. The heater 120 heats the evacuator 115, the nebulizer 130, and the heat exchanger 135 to keep the received volume of the high-melting-point liquid 165 from freezing. The nebulizer 130 also receives gas (e.g., argon) from the gas source 125 (or another gas source) via the heat exchanger 135, as indicated by arrows 185a-b. In response to the nebulizer 130 receiving the volume of the high-melting-point liquid 165 from the evacuator 115 and the gas (e.g., argon) from the gas source 125, the nebulizer 130 aerosolizes the received volume of the high-melting-point liquid 165 and communicates the aerosolized high-melting-point liquid to the interface apparatus 140, as indicated by arrow 190. Before, during, or after the nebulizer 130 aerosolizes the received volume of the high-melting-point liquid 165, the vacuum source 138 applies a reduced or negative gas pressure to the evacuator 115, as indicated by arrow 195. The reduced or negative gas pressure applied to the evacuator 115 withdraws any non-aerosolized remainder of the high-melting-point liquid from the nebulizer 130 and back into the evacuator 115, as indicated by arrow 200. In some embodiments, withdrawal of the non-aerosolized remainder of the high-melting-point liquid from the nebulizer 130 and back into the evacuator 115 prevents, or at least reduces, cooling and/or freezing of the non-aerosolized remainder of the high-melting-point liquid within the nebulizer 130, which would otherwise be difficult to clean out.

The interface apparatus 140 sweeps the aerosolized high-melting-point liquid into the FAAS 145, as indicated by arrow 205. The FAAS 145 identifies and quantifies element(s) in the aerosolized high-melting-point liquid. In addition, or instead, the interface apparatus 140 sweeps the aerosolized high-melting-point liquid into the ICP torch 150 (or another interface apparatus), as indicated by arrow 210. The ICP torch 150 heats the aerosolized high-melting-point liquid in a plasma. As a result, the ICP torch emits electromagnetic radiation (e.g., in the visible, ultraviolet, and near-infrared ranges of the electromagnetic spectrum) and gas-phase atoms/ions. In some embodiments, as in FIG. 1B, the ICP torch 150 forms part of the ICP-MS 155; accordingly, the mass spectrometer of the ICP-MS 155 receives the gas-phase atoms/ions emitted from the plasma generated by the ICP torch 150, as indicated by arrow 215, to identify and quantify element(s) in the aerosolized high-melting-point liquid. Specifically, in one or more embodiments, the gas-phase atoms/ions entering the mass spectrometer of the ICP-MS 155 are hit by fast electrons to convert the gas-phase atoms/ions into positively-charged ions. The positively-charged ions then move through the mass spectrometer of the ICP-MS 155 and are identified based on their mass-to-charge ratio. However, in other embodiments, the gas-phase atoms/ions (which can be positive or negative) are generated in another manner. In some embodiments, as in FIG. 1B, in addition, or instead, the ICP torch 150 forms part of the ICP-OES 160; accordingly, the optical emission spectrometer of the ICP-OES 160 receives the electromagnetic radiation emitted from the plasma generated by the ICP torch 150, as indicated by arrow 220, to identify and quantify element(s) in the aerosolized high-melting-point liquid. In other embodiments, rather than forming part of both the ICP-MS 155 and the ICP-OES 160, the ICP torch 150 may instead form part of only one of the ICP-MS 155 and the ICP-OES 160, while another ICP torch identical to the ICP torch 150 forms part of the other one of the ICP-MS 155 and the ICP-OES 160.

The operation of the system 100 enables operators to identify and quantify potentially corrosive components such as water ($H_2O$), oxygen ($O_2$), and/or other impurities in the high-melting-point liquid 165. Once such potentially corrosive components are identified and quantified, operators can determine how certain metals (e.g., alloys) behave when in contact with the high-melting-point liquid (with and without impurities). Based on this information, operators can monitor the concentration(s) of such potentially corrosive components in the high-melting-point liquid 165 and set alarms for any situation in which the concentration(s) of such potentially corrosive components in the high-melting-point liquid 165 stray outside of safe operating levels. Such alarms notify operators when it is necessary to take steps to reduce the concentration(s) of such potentially corrosive components in the high-melting-point liquid 165. In addition, based on the monitoring of the concentration(s) of such potentially corrosive components in the high-melting-point liquid 165 over time, operators can plan for the maintenance, repair, remediation, and/or replacement of critical components of the molten liquid conduit 105 (or other components in contact with the high-melting-point liquid 165) before failure of such critical components occurs.

As mentioned above, the molten liquid conduit 105 can be part of a molten salt loop associated with a nuclear reactor, in which case the system 100 supports the reliability of the nuclear reactor. For example, the system 100 may enable operators of the nuclear reactor to monitor fuel concentration(s) (e.g., uranium-235 or other fuel isotopes), which must remain at certain levels for the nuclear reactor to function properly. For another example, the system 100 may enable operators of the nuclear reactor to monitor fission products (e.g., thorium-231). For yet another example, the system 100 may enable operators of the nuclear reactor to monitor medically useful isotopes (e.g., molybdenum-99), which can then be removed. Furthermore, although described as including the FAAS 145, the ICP-MS 155, and the ICP-OES 160, in addition, or instead, the system 100 may include other analytical instrumentation configured to receive the aerosolized high-melting-point liquid from the nebulizer 130 and to determine the chemical contents of the aerosolized high-melting-point liquid.

Figure 2:
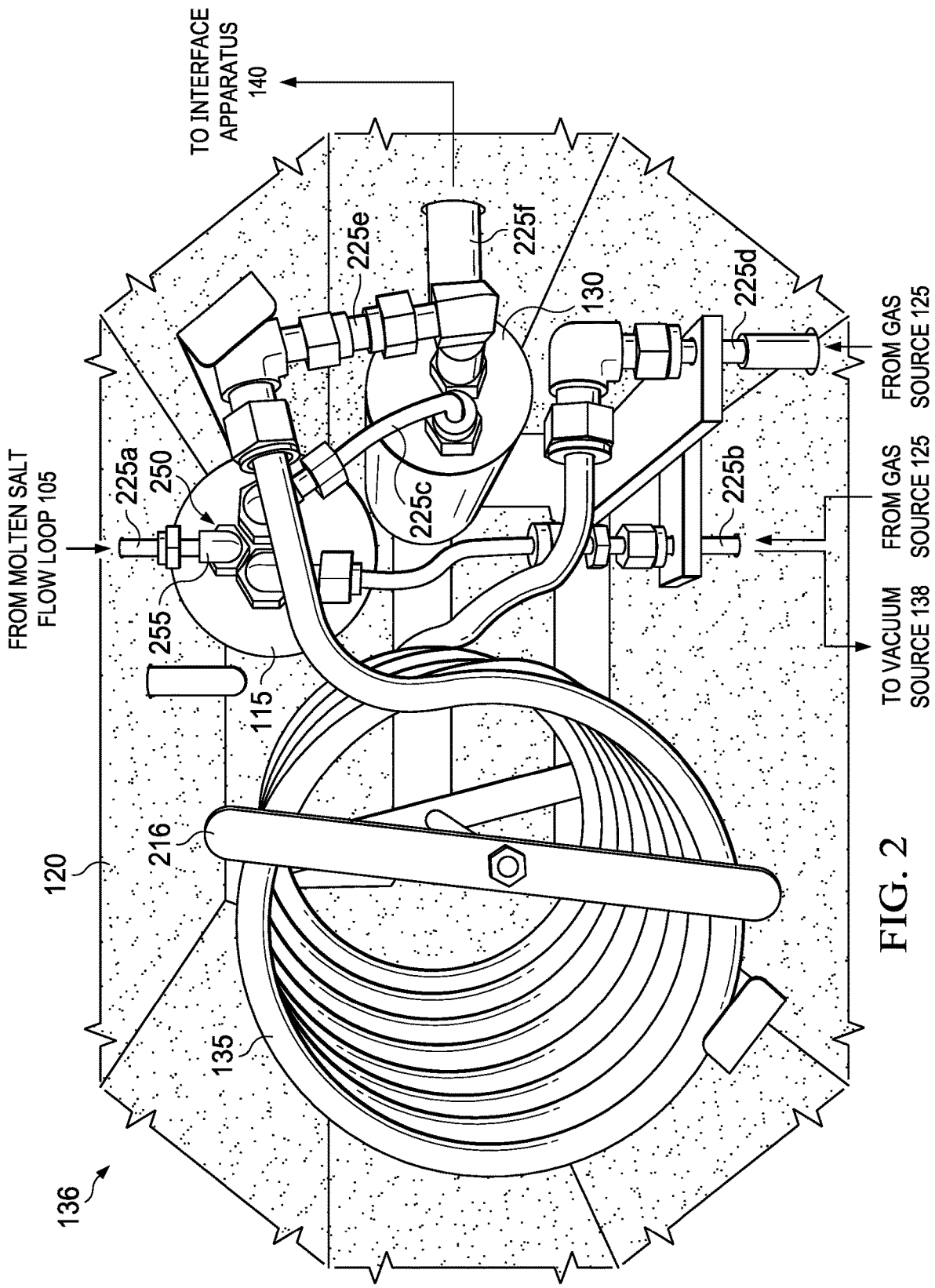
FIG. 2 is a top plan view of a nebulizer assembly of the system of FIG. 1B, according to one or more embodiments of the present disclosure.

Referring to FIG. 2, with continuing reference to FIG. 1B, in an embodiment, the evacuator 115, the nebulizer 130, and the heat exchanger 135 are contained within the heater 120 by a support apparatus 216. The support apparatus 216 may be fabricated from carbon steel. In some embodiments, the heater 120 is an Olympic Doll E/Test E Kiln. During the operation of the system 100: a molten liquid conduit 225a communicates high-melting-point liquid from the molten liquid conduit 105 to the evacuator 115; a gas conduit 225b communicates gas from the gas source 125 to the evacuator 115; a molten liquid conduit 225c communicates high-melting-point liquid from the evacuator 115 to the nebulizer 130; a gas conduit 225d communicates gas from the gas source 125 (or another gas source) to the heat exchanger 135; a gas conduit 225e communicates gas from the heat exchanger 135 to the nebulizer 130; and an aerosol conduit 225f communicates aerosolized high-melting-point liquid from the nebulizer 130 to the interface apparatus 140. Moreover, in those embodiments in which the vacuum source 138 is, includes, or is part of the gas source 125, the fluid conduit 225b also applies a reduced or negative gas pressure from the vacuum source 138 to the evacuator 115.

Figure 3:
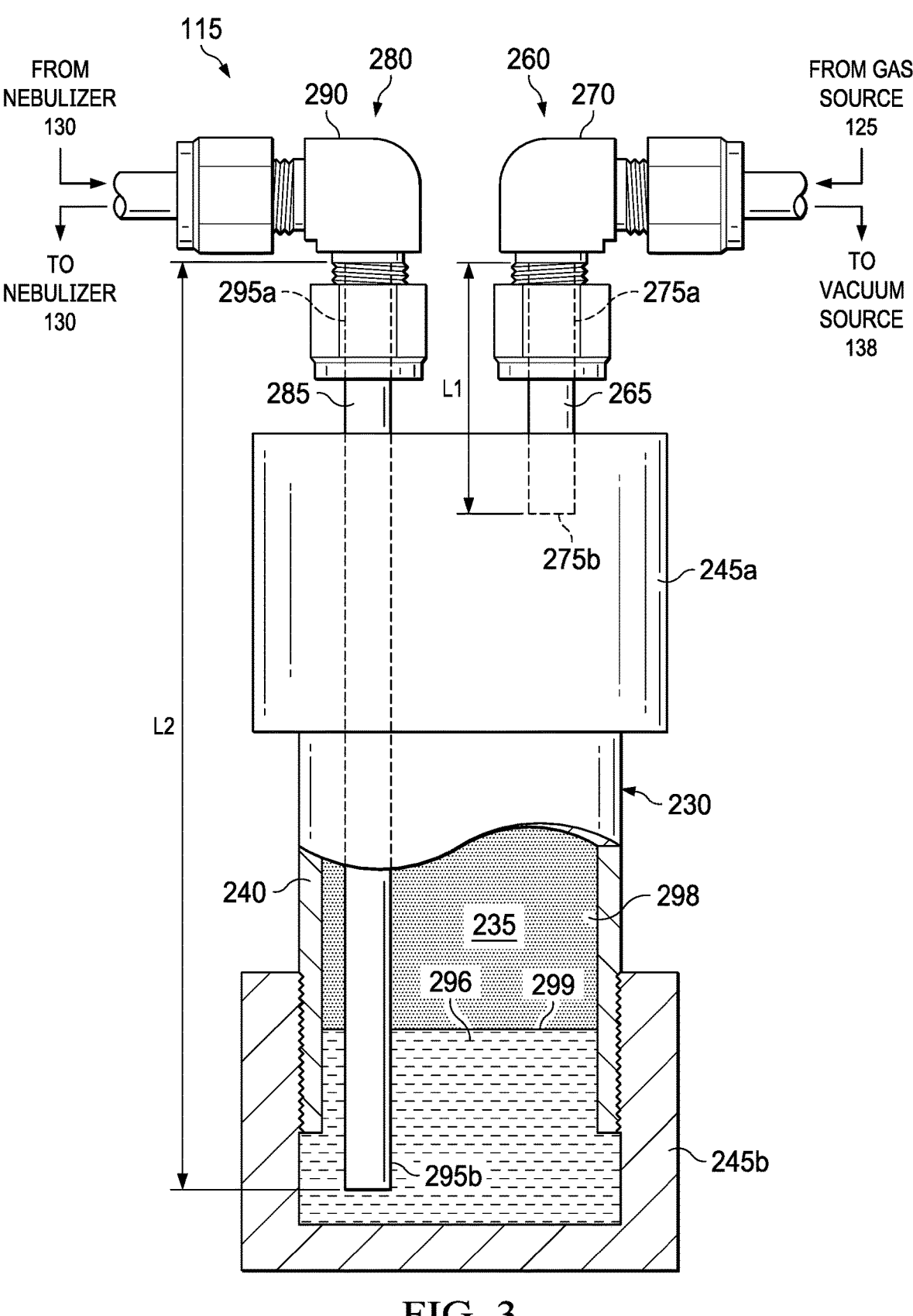
FIG. 3 is a partial cross-sectional elevational view of an evacuator of the nebulizer assembly of FIG. 2, according to one or more embodiments of the present disclosure.

Referring to FIG. 3, with continuing reference to FIGS. 1 and 2, in an embodiment, the evacuator 115 includes a fluid vessel 230 defining an internal cavity 235. The fluid vessel 230 includes a central portion 240 and opposing end portions 245a and 245b. In some embodiments, the central portion 240 is a 3.5 in. long×1.5 in. I.D. SS316 NPT pipe. In some embodiments, the opposing end portions 245a and 245b are each a high-pressure SS316 1.5 in. I.D. pipe cap. The evacuator 115 also includes a molten liquid inlet 250 (not visible in FIG. 3; shown in FIG. 2). In some embodiments, the molten liquid inlet 250 includes a fitting 255 coupled to the evacuator 115 so as to communicate with the internal cavity 235 of the fluid vessel 230. For example, the fitting 255 may be connected to the end portion 245a of the fluid vessel 230. Alternatively, the evacuator 115 may further include a tube (not shown) to which the fitting 255 is connected, which tube extends through the end portion 245a of the fluid vessel 230.

The evacuator 115 also includes a gas conduit 260. In some embodiments, the gas conduit 260 includes a tube 265 and a fitting 270. The tube 265 defines opposing end portions 275a and 275b and has a length L1. In some embodiments, the tube 265 extends through the end portion 245a of the fluid vessel 230. For example, the end portion 275a of the tube 265 may extend proximate the end portion 245a of the fluid vessel 230. In some embodiments, the tube 265 is a 0.25 in. O.D. SS316 tube. The fitting 270 is connected to the tube 265 at the end portion 275a. In some embodiments, the fitting 270 is a Yor-Lok 90° elbow fitting for 0.25-in. O.D. tube. Alternatively, the tube 265 may be omitted from the evacuator 115 and the fitting 270 may instead be connected directly to the end portion 245a of the fluid vessel 230 to communicate with the internal cavity 235 of the fluid vessel 230.

The evacuator 115 also includes a molten liquid conduit 280. In some embodiments, the molten liquid conduit 280 includes a tube 285 and a fitting 290. The tube 285 defines opposing end portions 295a and 295b and has a length L2. The tube 285 extends through the end portion 245a of the fluid vessel 230 and into the internal cavity 235. The length L2 is greater than the length L1. As a result, the end portion 295b of the tube 285 extends closer to the end portion 245b of the fluid vessel 230, and farther from the end portion 245a of the fluid vessel 230, than the end portion 275b of the tube 265. For example, the end portion 295b of the tube 285 may extend within the internal cavity 235 proximate the end portion 245b of the fluid vessel 230. In contrast, the end portion 295a of the tube 285 extends outside the fluid vessel 230. In some embodiments, the tube 285 is a 0.25 in. O.D. SS316 tube. The fitting 290 is connected to the tube 285 at the end portion 295a. In some embodiments, the fitting 290 is a Yor-Lok 90° elbow fitting for 0.25-in. O.D. tube.

During the operation of the system 100, high-melting-point liquid 296 is communicated from the molten liquid conduit 105 to the evacuator 115 via the molten liquid conduit 225a (shown in FIG. 2). Gas 298 (e.g., argon) is then communicated from the gas source 125 to the evacuator 115 via the gas conduit 225b (shown in FIG. 2) and the gas conduit 260 (shown in FIG. 3) to apply a positive gas pressure to a surface 299 of the high-melting-point liquid 296. The end portion 295b of the tube 285 of the molten liquid conduit 280 extends beneath the surface 299 of the high-melting-point liquid 296. Accordingly, in response to the positive gas pressure applied to the surface 299 of the high-melting-point liquid 296, the high-melting-point liquid 296 is communicated from the evacuator 115 to the nebulizer 130 via the molten liquid conduit 280 (shown in FIG. 3) and the molten liquid conduit 225c (shown in FIG. 2). The gas 298 in the evacuator 115 is then communicated to the vacuum source 138 via the gas conduit 260 (shown in FIG. 3) and the gas conduit 225b (shown in FIG. 2) to apply a decreased or negative gas pressure to the surface 299 of the high-melting-point liquid 296. In response to the decreased or negative gas pressure applied to the surface 299 of the high-melting-point liquid 296, any of the high-melting-point liquid 296 remaining in the nebulizer is withdrawn back into the evacuator 115 via the molten liquid conduit 225c (shown in FIG. 2) and the molten liquid conduit 280 (shown in FIG. 3). In some embodiments, withdrawal of the high-melting-point liquid 296 from the nebulizer 130 back into the evacuator 115 prevents, or at least reduces, cooling and/or freezing of the high-melting-point liquid 296 within the nebulizer 130, which would otherwise be difficult to clean out.

Figure 4:
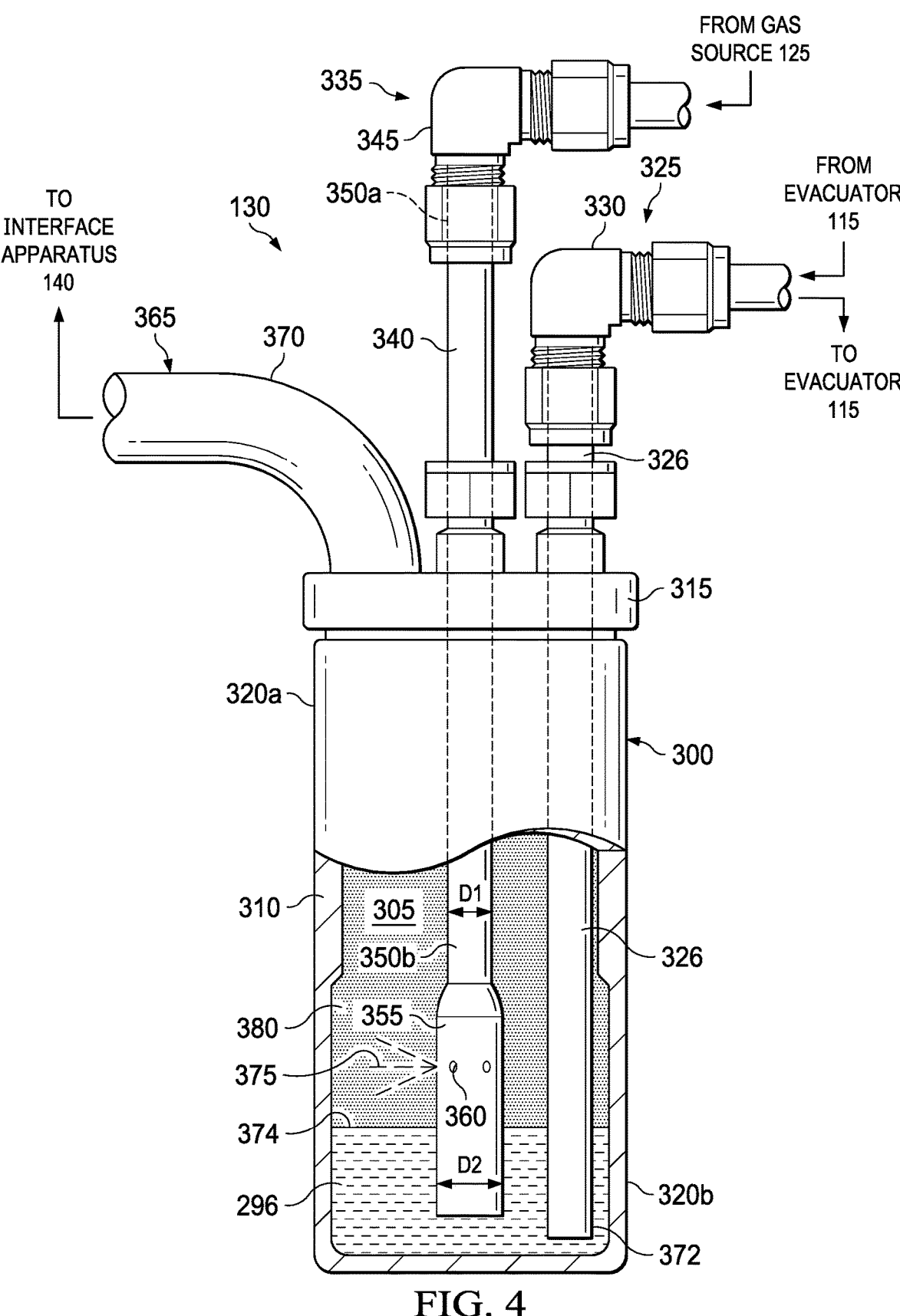
FIG. 4 is a partial cross-sectional elevational view of a nebulizer of the nebulizer assembly of FIG. 2, according to one or more embodiments of the present disclosure.

Referring to FIG. 4, with continuing reference to FIGS. 1 and 2, in an embodiment, the nebulizer 130 includes a fluid vessel 300 defining an internal cavity 305. The fluid vessel 300 includes a jar 310 and a lid 315. The jar 310 defines opposing end portions 320a and 320b. The jar 310 is open at the end portion 320a and closed at the end portion 320b. The lid 315 is connected to the jar 310 at the end portion 320a. For example, the lid 315 may be threadably connected to the jar 310. In some embodiments, the nebulizer 130 is a three-jet MRE-style Collison nebulizer with an 8-oz SS316 jar from CH Technologies. The nebulizer 130 also includes a molten liquid conduit 325. In some embodiments, the molten liquid conduit 325 includes a fitting 330 coupled to the nebulizer 130 so as to communicate with the internal cavity 305 of the fluid vessel 300. For example, the fitting 330 may be connected to the lid 315 of the nebulizer 130. Alternatively, the nebulizer 130 may further include a tube 326 to which the fitting 330 is connected, which tube 326 extends through the lid 315 of the nebulizer 130.

The nebulizer 130 also includes a gas conduit 335. In some embodiments, the gas conduit 335 includes a tube 340 and a fitting 345. The tube 340 defines opposing end portions 350a and 350b and has an outer diameter D1. The tube 340 extends through the lid 315 and into the internal cavity 305 of the fluid vessel 300. For example, the end portion 350b of the tube 340 may extend within the internal cavity 305 of the fluid vessel 300 proximate the end portion 320b of the jar 310. In contrast, the end portion 350a of the tube 340 extends outside the fluid vessel 300. The fitting 345 is connected to the tube 340 at the end portion 350a. The nebulizer 130 also includes a jet 355. The jet 355 is connected to the tube 340 at the end portion 350b. The jet 355 has an outer diameter D2. The outer diameter D2 is greater than the outer diameter D1. The jet 355 includes spray holes 360 distributed (e.g., evenly) therearound.

The nebulizer 130 also includes an aerosol outlet 365. In some embodiments, the aerosol outlet 365 includes a curved tube 370 coupled to the nebulizer 130 so as to communicate with the internal cavity 305 of the fluid vessel 300. For example, the curved tube 370 of the aerosol outlet 365 may be connected to the lid 315 of the nebulizer 130. The aerosol outlet 365 is configured to sweep away the aerosolized high-melting-point liquid. The curved tube 370 of the aerosol outlet 365 defines an enlarged flow passageway as compared to the tube 340 of the gas conduit 335. The enlarged flow passageway of the aerosol outlet 365 is configured to accommodate the increased volume of the high-melting-point liquid after it has been aerosolized.

During the operation of the system 100, the high-melting-point liquid 296 is communicated from the evacuator 115 to the nebulizer 130 via the molten liquid conduit 225c (shown in FIG. 2) and the molten liquid conduit 325 (shown in FIG. 4). In some embodiments, a distal end 372 of the tube 326 of the molten liquid conduit 325 extends beneath a surface 374 of the high-melting-point liquid 296 proximate the end portion 320b of the jar 310. Gas 375 (e.g., argon) is then communicated from the gas source 125 to the nebulizer 130 via the gas conduits 225d and 225e (shown in FIG. 2) and the gas conduit 335 (shown in FIG. 4) to nebulize the high-melting-point liquid 296 into an aerosolized high-melting-point liquid 380. In some embodiments, the spray holes 360 of the tube 340 of the gas conduit 335 extend above the surface 374 of the high-melting-point liquid 296. The aerosolized high-melting-point liquid 380 is then communicated to the interface apparatus 140 via the aerosol outlet 365 (shown in FIG. 4) and the aerosol conduit 225_f_ (shown in FIG. 2). In some embodiments, the aerosolized high-melting-point liquid 380 exiting the nebulizer 130 via the aerosol outlet 365 includes droplets having 20-30 μm diameters. Finally, any of the high-melting-point liquid 296 remaining in the nebulizer 130 is withdrawn back into the evacuator 115 via the molten liquid conduit 325 (shown in FIG. 4) and the molten liquid conduit 225_c_ (shown in FIG. 2).

In some embodiments, the nebulizer 130 may be omitted and replaced with another nebulizer in which the pump 110 generates the pressure needed to force the high-melting-point liquid 296 through a nozzle to create the aerosolized high-melting-point liquid. In other embodiments, the nebulizer 130 may be omitted and replaced with yet another nebulizer utilizing a different nebulization process such as, for example, pneumatic nebulization, ultrasonic nebulization, the like, or a combination thereof. In some embodiments, in addition, or instead, the evacuator 115 may be omitted from the nebulizer assembly 136.

Figure 5:
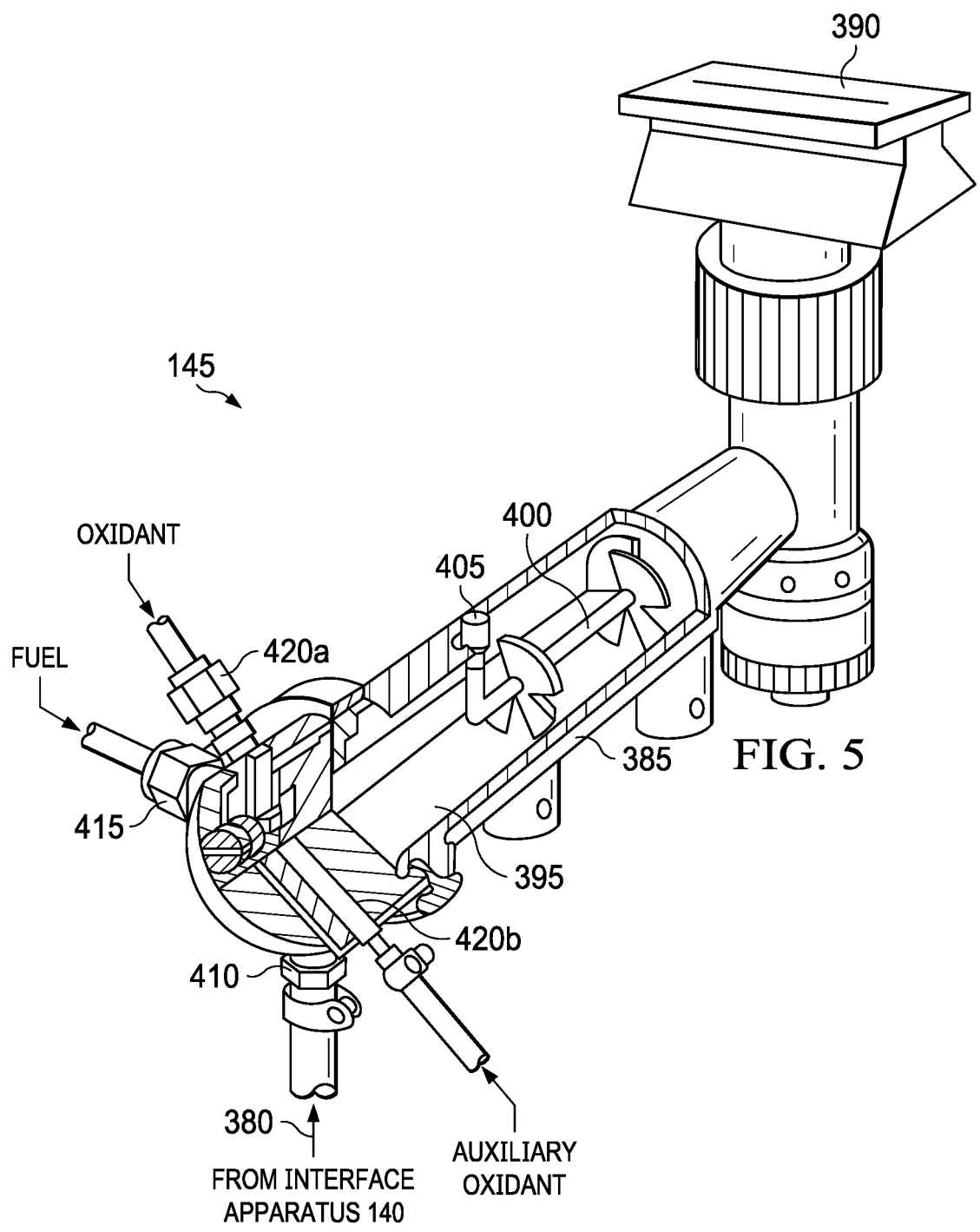
FIG. 5 is a partial cross-sectional perspective view of a flame atomic absorption spectrometer ("FAAS") of the system of FIG. 1B, according to one or more embodiments of the present disclosure.

Referring to FIG. 5, with continuing reference to FIG. 1B, in an embodiment, the FAAS 145 includes a body 385 and a burner head 390. The body 385 defines a spray chamber 395 in which a flow spoiler 400 extends. The flow spoiler 400 is retained within the spray chamber 395 via a flow spoiler retaining screw 405. The body 385 includes an aerosol port 410, a fuel port 415, and oxidant port(s) 420_a_ and/or 420_b_. During the operation of the system 100, the aerosolized high-melting-point liquid 380 is communicated from the nebulizer 130 to the spray chamber 395 via the interface apparatus 140 (shown in FIG. 1B) and the aerosol port 410. Additionally, fuel (e.g., acetylene) and oxidant(s) (e.g., compressed air) are communicated to the spray chamber 395 of the body 385 via the fuel port 415 and the oxidant port(s) 420_a_ and/or 420_b_. The aerosolized high-melting-point liquid 380 mixes with the fuel and the oxidant(s) and flows to the burner head 390 via the flow spoiler 400. The burner head 390 then ignites the mixture and the flame is evaluated to identify and/or quantify element(s) in the aerosolized high-melting-point liquid 380. For example, the presence of sodium in the aerosolized high-melting-point liquid 380 is indicated by an intense yellow-orange light having a wavelength of 589 nanometers being emitted from the flame. For another example, the absorbance of nickel and magnesium in the aerosolized high-melting-point liquid 380 can be measured by the FAAS 145, that is, the FAAS 145 verifies the presence of both nickel and magnesium independently in the aerosolized high-melting-point liquid 380. Based on this information, a calibration curve and a detection limit for magnesium in the high-melting-point liquid 296 can be established using nickel as an internal standard. The FAAS 145 can also detect other metals in the aerosolized high-melting-point liquid 380 in the parts per million range.

Figure 6:
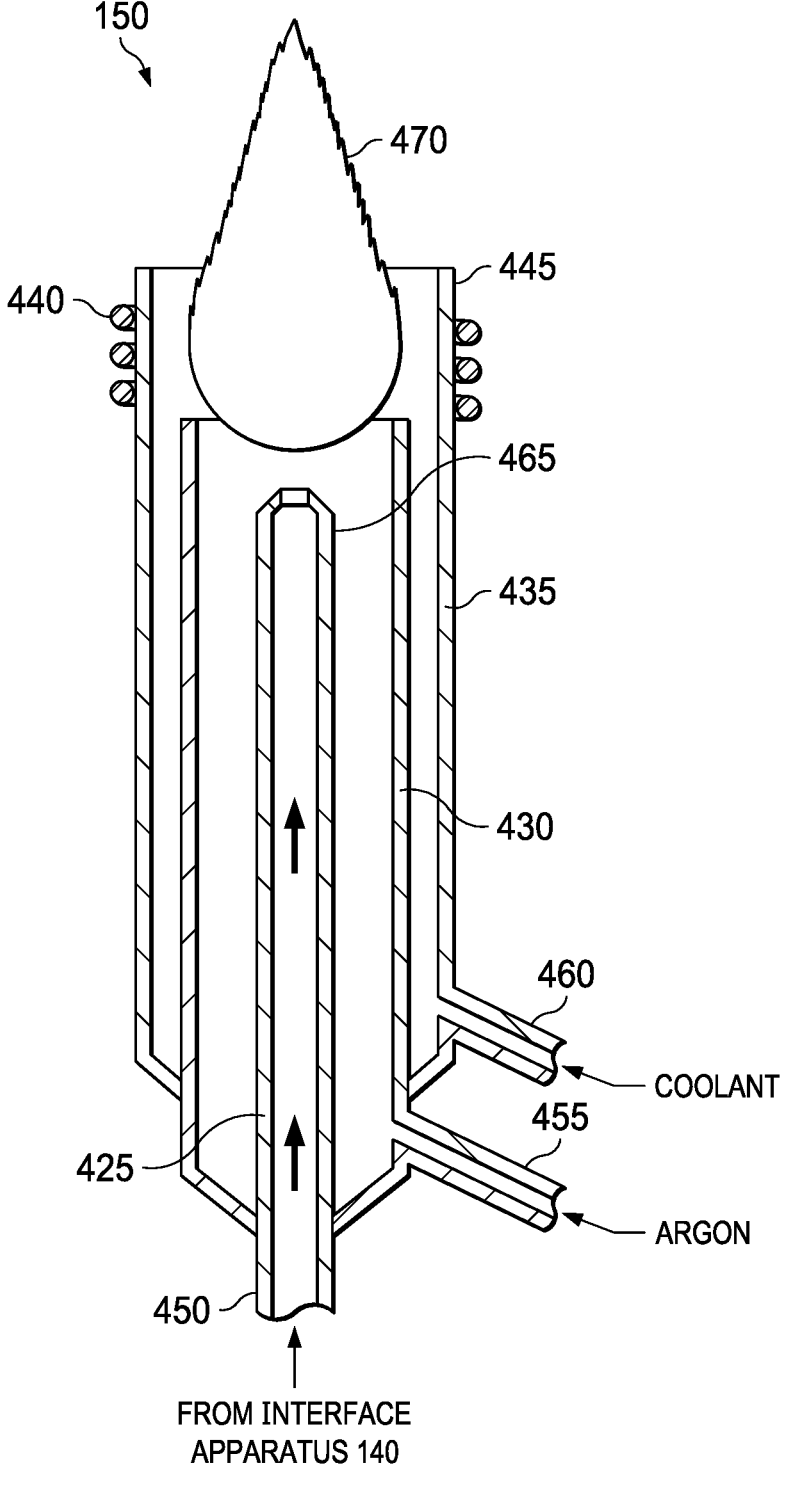
FIG. 6 is a cross-sectional elevational view of an inductively coupled plasma ("ICP") torch of the system of FIG. 1B, according to one or more embodiments of the present disclosure.

Referring to FIG. 6, with continuing reference to FIG. 1B, in an embodiment, the ICP torch 150 includes a capillary 425, an inner tube 430 extending around the capillary 425, an outer tube 435 extending around the inner tube 430, and a load coil 440 circumscribing a distal end 445 of the outer tube 435. The capillary 425 includes an aerosol port 450. The inner tube 430 includes an auxiliary port 455. The outer tube 435 includes a coolant port 460. During the operation of the system 100, the aerosolized high-melting-point liquid 380 is communicated from the nebulizer 130 to the capillary 425 via the interface apparatus 140 (shown in FIG. 1B) and the aerosol port 450. Additionally, auxiliary gas (e.g., argon gas) is communicated to the inner tube 430 surrounding the capillary 425 via the auxiliary port 455. The auxiliary gas becomes a plasma 470 proximate a distal end 465 of the capillary 425. Coolant (e.g., argon gas) is communicated to the outer tube 435 surrounding the inner tube 430 via the coolant port 460. The aerosolized high-melting-point liquid 380 enters the plasma 470 at the distal end 465 of the capillary 425 and is heated by the plasma 470 causing the ICP torch 150 to emit electromagnetic radiation (e.g., in the visible, ultraviolet, and near-infrared ranges of the electromagnetic spectrum) and gas-phase atoms/ions. The load coil 440 forms a strong magnetic field inside the ICP torch 150 to control the plasma 470. With the ICP torch 150 operably coupled to the nebulizer 130, the ICP torch can be used for additional analytical techniques, as shown in FIGS. 1, 7, and 8.

Figure 7:
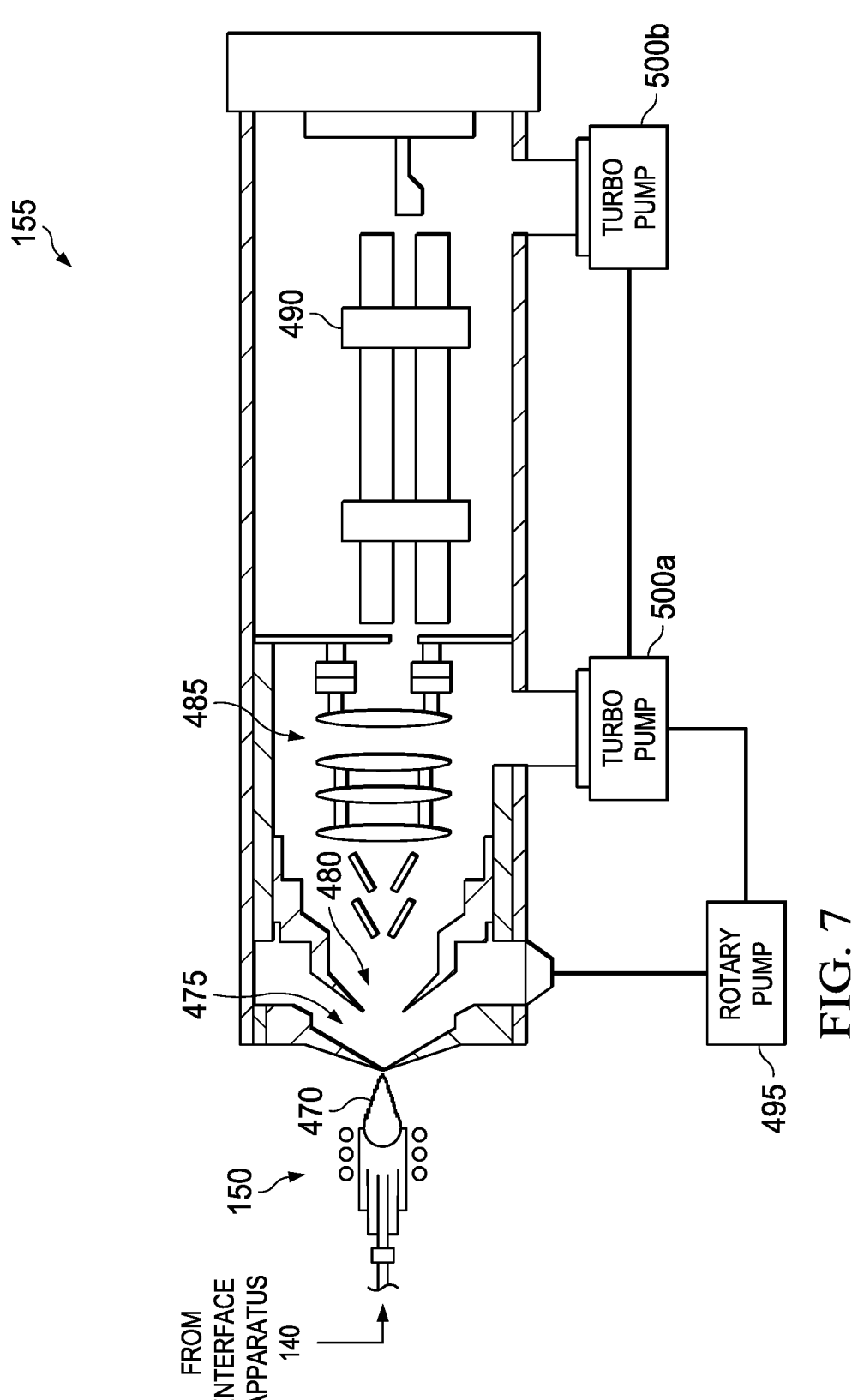
FIG. 7 is a schematic diagram of an inductively coupled plasma mass spectrometer ("ICP-MS") of the system of FIG. 1B, according to one or more embodiments of the present disclosure.

Referring to FIG. 7, with continuing reference to FIGS. 1 and 6, the ICP-MS 155 is configured to receive gas-phase atoms/ions emitted from the plasma 470 generated by the ICP torch 150. In some embodiments, the ICP-MS 155 is, includes, or is part of the ICP torch 150. In some embodiments, the ICP-MS 155 is an Agilent 7500 ICP-MS. The ICP-MS 155 includes a sampler cone 475, a skimmer 480, lenses 485, and a quadrupole ("Q-pole") mass spectrometer 490. During the operation of the system 100, the gas-phase atoms/ions emitted from the plasma 470 pass through the sampler cone 475, the skimmer 480, and the lenses 485. The lenses 485 focus the gas-phase atoms/ions emitted from the plasma 470 into the Q-pole mass spectrometer 490, which identifies and/or quantifies element(s) in the aerosolized high-melting-point liquid 380. The ICP-MS 155 also includes a rotary pump 495 and turbo pumps 500_a_ and 500_b_ operable to maintain proper vacuum during the operation of the system 100.

Figure 8:
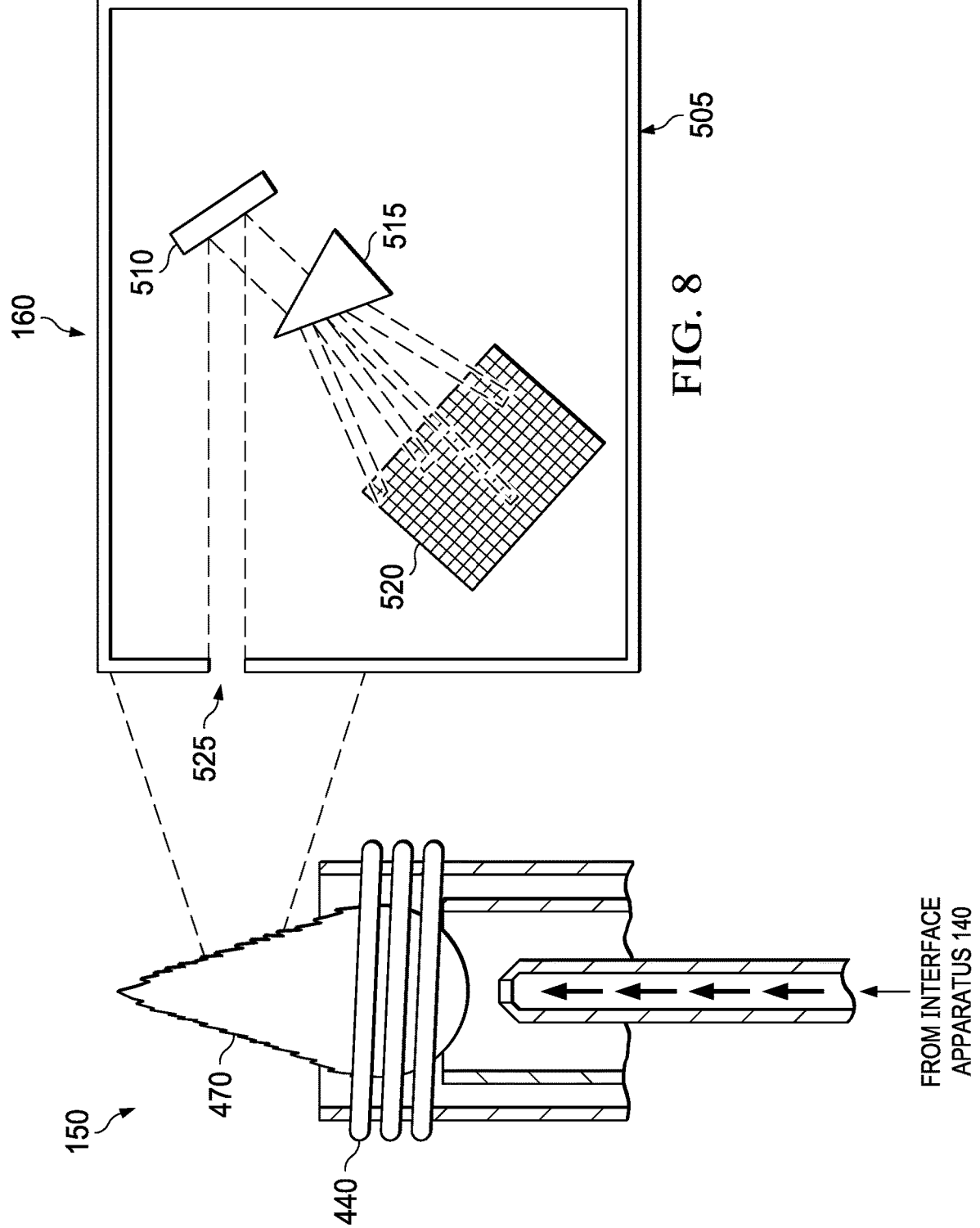
FIG. 8 is a schematic diagram of an inductively coupled plasma optical emission spectrometer ("ICP-OES") of the system of FIG. 1B, according to one or more embodiments of the present disclosure.

Referring to FIG. 8, with continuing reference to FIGS. 1 and 6, in an embodiment, the ICP-OES 160 is configured to receive electromagnetic radiation emitted from the plasma flame 470 generated by the ICP torch 150. In some embodiments, the ICP-OES 160 is, includes, or is part of the ICP torch 150. In some embodiments, the ICP-OES 160 is an Echelle monochromator. The ICP-OES 160 includes a housing 505, a diffraction grating 510, a prism 515, and a charge-coupled device ("CCD") detector 520. The housing 505 defines an entrance window 525. During the operation of the system 100, the electromagnetic radiation emitted from the plasma flame 470 passes through the entrance window 525 in the housing 505, reflects off of the diffraction grating 510, and passes through the prism 515. The prism 515 casts the electromagnetic radiation emitted from the plasma 470 onto the CCD detector 520, which identifies and/or quantifies element(s) in the aerosolized high-melting-point liquid 380.

Figure 9:
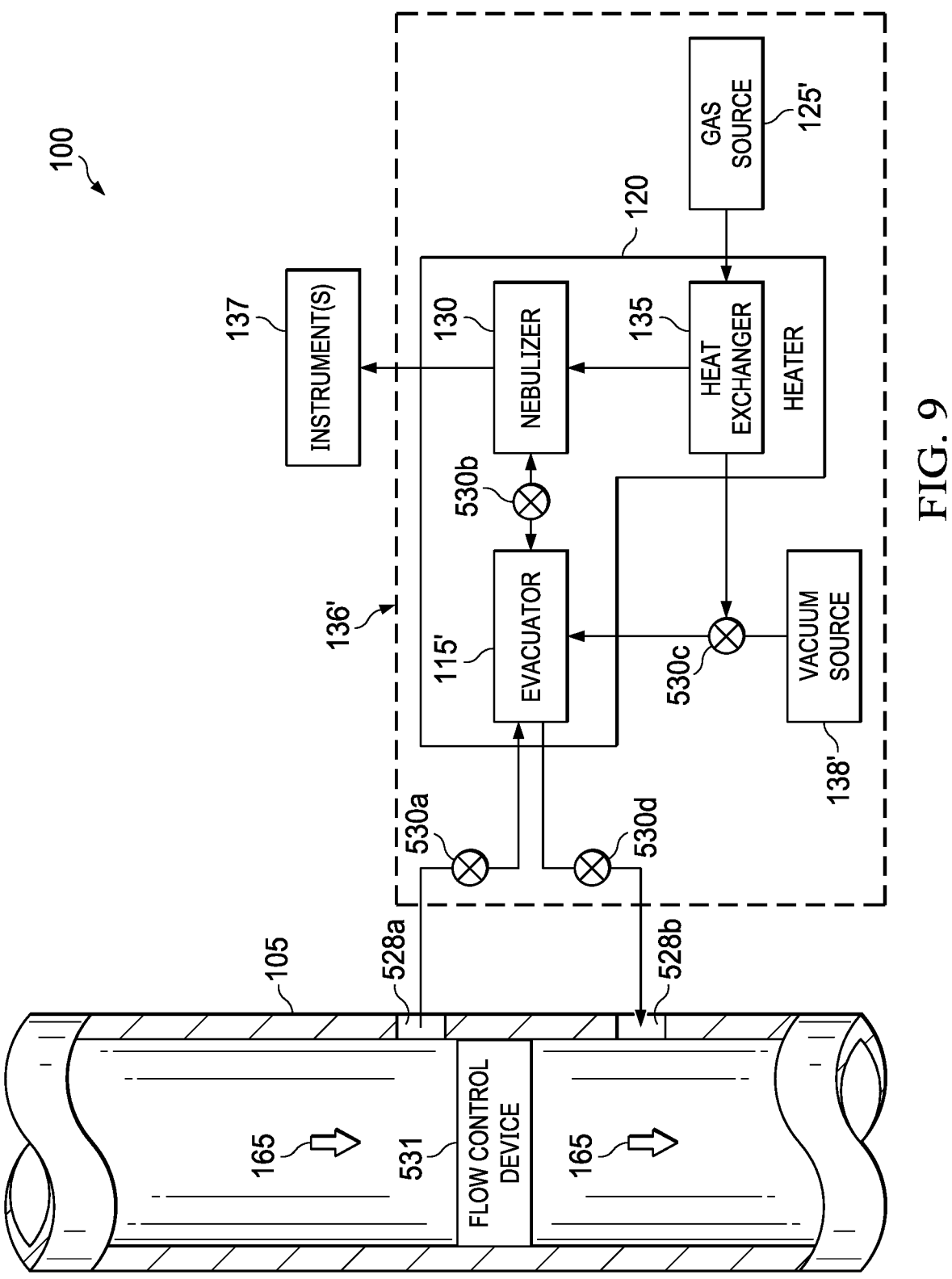
FIG. 9 is a schematic diagram of the system of FIG. 1A according to another embodiment of the present disclosure.

Referring to FIG. 9, with continuing reference to FIG. 1A, in an embodiment, the nebulizer assembly 136 is omitted from the system 100 and replaced by a nebulizer assembly 136'. The nebulizer assembly 136' includes several features/components that are substantially identical to corresponding features/components of the nebulizer assembly 136, which substantially identical features/components are referred to by the same reference numerals. The nebulizer assembly 136' includes an evacuator 115' configured to receive a volume of the high-melting-point liquid 165 from an outlet 528_a_ of the molten liquid conduit 105. The evacuator 115' is similar to the evacuator 115 described above, except that the evacuator 115' defines an internal volume specifically sized to accommodate only the volume of the high-melting-point liquid desired for delivery into the nebulizer 130 to be aerosolized. Accordingly, the internal volume of the evacuator 115' may be referred to as a metering chamber.

A valve 530a is operably coupled between the outlet 528a of the molten liquid conduit 105 and the evacuator 115', which valve 530a is actuable between open and closed positions to either permit or block flow of the high-melting-point liquid 165 from the outlet 528a of the molten liquid conduit 105 and into the evacuator 115'. The valve 530a is a two-way valve. Similarly, a valve 530b is operably coupled between the evacuator 115' and the nebulizer 130, which valve 530b is actuable between open and closed positions to either permit or block flow of the high-melting-point liquid 165 from the evacuator 115' to the nebulizer 130, and vice versa. The valve 530b is a two-way valve.

The nebulizer assembly 136' also includes a gas source 125', which gas source 125' is similar to the gas source 125 except that, rather than delivering gas directly to the evacuator 115, as in FIG. 1B, the gas source 125' is configured to deliver gas to the evacuator 115' via the heat exchanger 135 and a valve 530c operably coupled between the heat exchanger 135 and the evacuator 115', as shown in FIG. 9. The nebulizer assembly 136' also includes a vacuum source 138', which vacuum source 138' is similar to the vacuum source 138, except that, rather than applying a decreased or negative gas pressure directly to the evacuator 115, as in FIG. 1B, the vacuum source 138' is configured to apply the decreased or negative gas pressure to the evacuator 115' via the valve 530c operably coupled between the vacuum source 138' and the evacuator 115', as shown in FIG. 9.

The valve 530c is a three-way valve actuable between: a first open position in which the valve 530c permits fluid communication between the gas source 125' (via the heat exchanger 135) and the evacuator 115' while blocking fluid communication between the vacuum source 138' and the evacuator 115'; a second open position in which the valve 530c permits fluid communication between the vacuum source 138' and the evacuator 115' while blocking fluid communication between the gas source 125' and the evacuator 115'; and a closed position in which the valve 530c blocks fluid communication between the gas source 125' and the evacuator 115' while also blocking fluid communication between the vacuum source 138' and the evacuator 115'. Alternatively, the valve 530c may be omitted and replaced by a pair of two-way valves (not shown), one of which is actuable between open and closed positions to permit or block fluid communication between the gas source 125' and the evacuator 115', and the other of which is actuable between open and closed positions to permit or block fluid communication between the vacuum source 138' and the evacuator 115'.

A valve 530d is operably coupled between the evacuator 115' and an inlet 528b of the molten liquid conduit 105, which valve 530d is actuable between open and closed positions to either permit or block flow of the high-melting-point liquid 165 from the evacuator 115' back into the molten liquid conduit 105 via the inlet 528b. The valve 530d is a two-way valve. Alternatively, the valves 530a and 530d may be omitted and replaced by a three-way valve similar in structure and operation to the valve 530c.

In some embodiments, as in FIG. 9, the inlet 528b of the molten liquid conduit 105 is downstream from the outlet 528a of the molten liquid conduit 105. However, in other embodiments, the inlet 528 of the molten liquid conduit 105 may be upstream from the outlet 528a of the molten liquid conduit 105. A flow control device 531 can be positioned within, operably coupled to, and/or otherwise incorporated into the molten liquid conduit 105, between the outlet 528a and the inlet 528b. The flow control device 531 is actuable to partially (i.e., via throttling) and/or completely block flow of the high-melting-point liquid within the molten liquid conduit 105. In some embodiments, the flow control device 531 is omitted.

Table 1 illustrates various operational configurations for the valves 530a-d, as will be described in further detail below.

TABLE 1

| Configuration | Valve | Position |
|---|---|---|
| A | 530a | Open |
| | 530b | Closed |
| | 530c | Closed |
| | 530d | Open |
| B | 530a | Closed |
| | 530b | Open |
| | 530c | Open ($1^{st}$) |
| | 530d | Closed |
| C | 530a | Closed |
| | 530b | Open |
| | 530c | Open ($2^{nd}$) |
| | 530d | Closed |
| D | 530a | Closed |
| | 530b | Closed |
| | 530c | Open ($1^{st}$) |
| | 530d | Open |

Referring to FIG. 10, with continuing reference to FIG. 9, in an embodiment, a method is generally referred to by the reference numeral 532. The method 532 includes, at a step 533a, permitting a volume of the high-melting-point liquid 165 to flow from the molten liquid conduit 105 into the nebulizer assembly 136', specifically the evacuator 115'. The step 533a can be executed by actuating the valves 530a-d to Configuration A, in which the valves 530a and 530d are open and the valves 530b and 530c are closed, as shown above in Table 1. Actuating the valves 530a-d to Configuration A allows the high-melting-point liquid 635 from the outlet 528a of the molten liquid conduit 105 to flow into and fill the evacuator 115', via the valve 530a, and return to the molten liquid conduit 105 via the valve 530d. Additionally, to encourage such flow of the high-melting-point liquid 635 to fill the evacuator 115', execution of the step 533a can further include actuating the flow control device 531 to partially (i.e., via throttling) and/or completely block flow of the high-melting-point liquid within the molten liquid conduit 105.

At a step 533b, the volume of high-melting-point liquid with which the evacuator 115' is filled is permitted to flow from the evacuator 115' to the nebulizer 130. The step 533b can be executed by actuating the valves 530a-d to Configuration B, in which the valves 530a and 530d are closed and the valves 530b and 530c are open, as shown above in Table 1. More particularly, in Configuration B, the three-way valve 530c is actuated to the first open position described above, in which the valve 530c permits fluid communication between the gas source 125' (via the heat exchanger 135) and the evacuator 115' while blocking fluid communication between the vacuum source 138' and the evacuator 115'. Actuating the valves 530a-d to Configuration B allows pressurized gas from the gas source 125' to displace the volume of high-melting-point liquid from the evacuator 115' into the nebulizer 130.

At a step 533c, at least a portion of the volume of the high-melting-point liquid in the nebulizer 130 is aerosolized, using the nebulizer 130. The structure and operation of the nebulizer 130 are described in detail above. Next, at a step 533*d*, the aerosolized high-melting-point liquid is permitted to flow to the instrument(s) 137 for chemical analysis. The structure and operation of the instrument(s) 137 are described in detail above, according to one or more embodiments.

At a step 533*e*, any remaining non-aerosolized high-melting-point liquid is evacuated from the nebulizer 130 using the evacuator 115'. The step 533*e* can be executed by actuating the valves 530*a-d* to Configuration C, in which the valves 530*a* and 530*d* are closed and the valves 530*b* and 530*c* are open, as shown above in Table 1. More particularly, in Configuration C, the three-way valve 530*c* is actuated to the second open position described above, in which the valve 530*c* permits fluid communication between the vacuum source 138' and the evacuator 115' while blocking fluid communication between the gas source 125' and the evacuator 115'. Actuating the valves 530*a-d* to Configuration C allows decreased or negative gas pressure from the vacuum source 138' to draw any remaining volume of high-melting-point liquid in the nebulizer 130 back into the evacuator 115'.

Finally, at a step 533*f*, the evacuated non-aerosolized high-melting-point liquid is permitted to flow from the evacuator 115' back to the molten liquid conduit 105. The step 533*f* can be executed by actuating the valves 530*a-d* to Configuration D, in which the valves 530*a* and 530*b* are closed and the valves 530*c* and 530*d* are open, as shown above in Table 1. More particularly, in Configuration D, the three-way valve 530*c* is actuated to the first open position described above, in which the valve 530*c* permits fluid communication between the gas source 125' (via the heat exchanger 135) and the evacuator 115' while blocking fluid communication between the vacuum source 138' and the evacuator 115'. Actuating the valves 530*a-d* to Configuration D allows pressurized gas from the gas source 125' to displace the volume of high-melting-point liquid from the evacuator 115' back into the molten liquid conduit 105, via the valve 530*d*.

Figure 11:
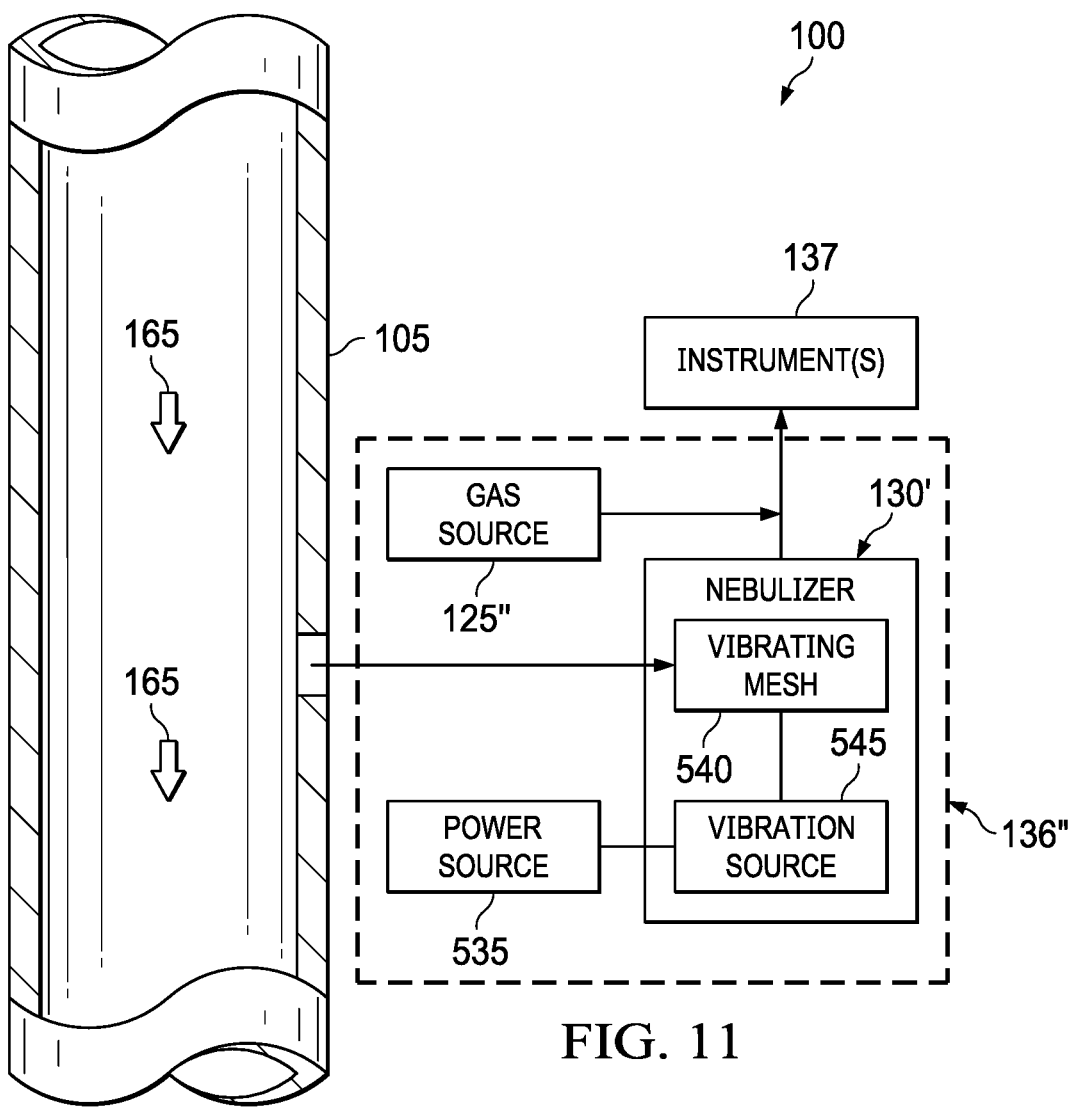
FIG. 11 is a schematic diagram of the system of FIG. 1A according to yet another embodiment of the present disclosure.

Referring to FIG. 11, with continuing reference to FIG. 1A, in an embodiment, the nebulizer assembly 136 is omitted from the system 100 and replaced by a nebulizer assembly 136". The nebulizer assembly 136" includes a nebulizer 130', which nebulizer 130' includes a vibrating mesh 540 operably coupled to (e.g., mounted on) a vibration source 545. A power source 535 provides electrical power to the vibration source 545, enabling the vibration source 545 to impart vibration to the vibrating mesh 540. In one or more embodiments, the power source 535 is operably coupled to the vibration source 545 with electrodes (not shown), which electrodes cause rapid deformation of the vibration source 545 when electrified, thereby causing the vibration source 545 to vibrate. When imparted with vibration from the vibration source 545, the vibrating mesh 540 aerosolizes high-melting-point liquid 165 received from the molten liquid conduit 105. The nebulizer assembly 136" also includes a gas source 125". The gas source 125" is adapted to deliver gas downstream from the vibrating mesh 540 to sweep the aerosolized high-melting-point liquid into the instrument(s) 137. The structure and operation of the instruments 137 is described in detail above, according to one or more embodiments. Although not shown in FIG. 11, in some embodiments, the gas source 125" delivers gas through a heat exchanger substantially identical to the heat exchanger 135 described herein, which heat exchanger is contained in a heater substantially similar to the heater 120 described herein.

Figure 12:
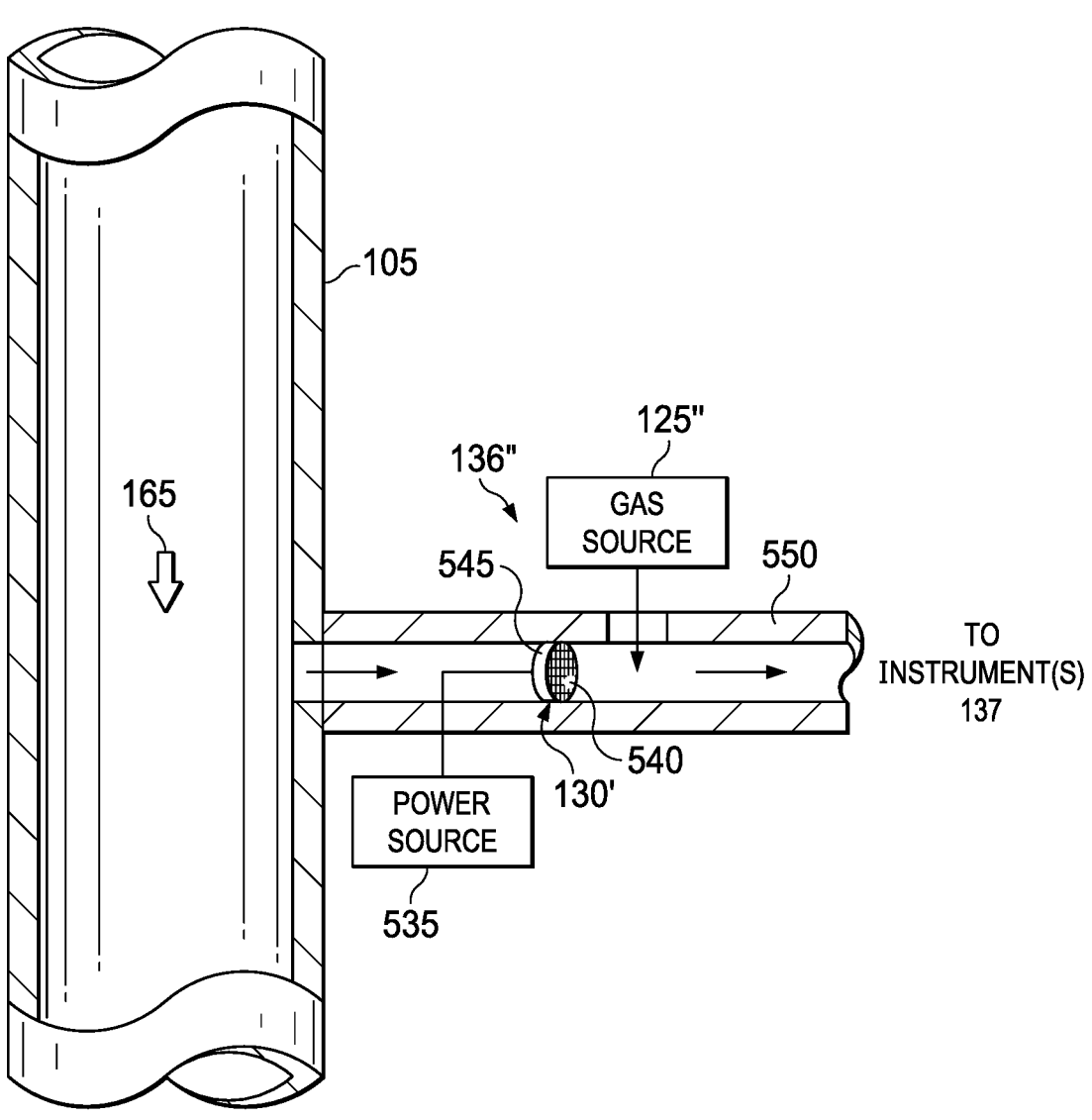
FIG. 12 is a more detailed schematic diagram of the system of FIG. 11, according to one or more embodiments of the present disclosure.

Referring to FIG. 12, with continuing reference to FIG. 11, in an embodiment, the vibrating mesh 540 is a disk-shaped mesh screen and the vibration source 545 is a ring-shaped piezoelectric material. In such embodiment(s), the nebulizer 130' can be mounted in a pipe 550 (e.g., on a tee) to which the high-melting-point liquid 165 is communicated from the molten liquid conduit 105. In some embodiments, the vibrating mesh is or includes a flat piece of metal having holes formed therethrough, which holes are tapered or curved so that each hole has a larger diameter on one side and a smaller diameter on the other side. In one or more embodiments, the vibrating mesh 540 is a disk-shaped mesh screen having a diameter of equal to or less than ½-inch. Likewise, in one or more embodiments, the vibration source 545 is a ring-shaped piezoelectric material having a diameter of equal to or less than ½-inch. The ring-shaped vibration source 545 engages the disk-shaped vibrating mesh 540 to impart vibration thereto. As the vibrating mesh 540 vibrates, the high-melting-point liquid 165 communicated to the vibrating mesh 540 passes through both the center of the ring-shaped vibration source 545 and the disk-shaped vibrating mesh 540, which converts the high-melting-point liquid into small droplets to thereby form an aerosol. The aerosol is carried to the instrument(s) 137 by an inert gas delivered into the pipe, from the gas source 125", downstream from the vibrating mesh 540. In some embodiments, the holes in the vibrating mesh 540 are sized and/or shaped so that, when vibration is not imparted to the vibrating mesh 540 by the vibration source 545, the vibrating mesh 540 does not permit the high-melting-point liquid to pass therethrough, that is, the vibrating mesh 540 only allows passage of the high-melting-point liquid therethrough vibration is imparted thereto by the vibration source 545. In one or more embodiments, the nebulizer assembly 136" including the nebulizer 130' facilitates aerosolization of the high-melting-point liquid 165 closer to the source so that a smaller volume of the high-melting-point liquid is required to be pulled out of the molten liquid conduit 105.

A system has been described herein. The system generally includes a molten liquid conduit; a nebulizer assembly operably coupled to the molten liquid conduit and adapted to receive, from the molten liquid conduit, a high-melting-point liquid; wherein the nebulizer assembly is further adapted to aerosolize at least a portion of the high-melting-point liquid received from the molten liquid conduit; and one or more instruments operably coupled to the nebulizer assembly and adapted to receive the aerosolized high-melting-point liquid from the nebulizer, wherein the one or more instruments are further adapted to chemically analyze the aerosolized high-melting-point liquid. In one or more embodiments, the nebulizer assembly includes: a nebulizer including a first fluid vessel in which the nebulizer is adapted to aerosolize the at least a portion of the high-melting-point liquid received from the molten liquid conduit. In one or more embodiments, the nebulizer assembly further includes: an evacuator including a second fluid vessel adapted to receive, from the molten liquid conduit, the high-melting-point liquid, the second fluid vessel being operably coupled to the first fluid vessel of the nebulizer. In one or more embodiments, the nebulizer assembly further includes: a valve operably coupled between, and in fluid communication with, the molten liquid conduit and the second fluid vessel of the evacuator. In one or more embodiments, the nebulizer assembly further includes a gas source adapted to communicate gas into the evacuator to thereby deliver the received high-melting-point liquid from the second fluid vessel of the evacuator into the first fluid vessel of the nebulizer. In one or more embodiments, the nebulizer assembly further includes a valve operably coupled between, and in fluid communication with, the first fluid vessel of the nebulizer and the second fluid vessel of the evacuator. In one or more embodiments, the nebulizer assembly further includes a vacuum source adapted to apply decreased or negative gas pressure from the vacuum source to the evacuator to thereby withdraw a non-aerosolized portion of the high-melting-point liquid from the first fluid vessel of the nebulizer and back into the second fluid vessel of the evacuator. In one or more embodiments, the nebulizer assembly further includes a valve operably coupled between, and in fluid communication with, the first fluid vessel of the nebulizer and the second fluid vessel of the evacuator. In one or more embodiments, the gas source is further adapted to communicate gas into the evacuator to thereby deliver the withdrawn non-aerosolized portion of the high-melting-point liquid from the evacuator and back into the molten liquid conduit. In one or more embodiments, the nebulizer assembly further includes a valve operably coupled between, and in fluid communication with, the second fluid vessel of the evacuator and the molten liquid conduit. In one or more embodiments, the nebulizer assembly includes: a nebulizer adapted to aerosolize the at least a portion of the received high-melting-point liquid, which nebulizer includes a vibrating mesh mounted to a vibration source; and a power source operably coupled to, and adapted to electrify, the vibration source to thereby cause the vibration source to vibrate. In one or more embodiments, the nebulizer assembly further includes a gas source adapted to communicate gas into the aerosolized high-melting-point liquid to deliver the aerosolized high-melting-point liquid from the nebulizer into the one or more instruments.

A method has also been described herein. The method generally includes: receiving, into a nebulizer assembly, a high-melting-point liquid from a molten liquid conduit; aerosolizing, using the nebulizer assembly, at least a portion of the received high-melting-point liquid; delivering, into one or more instruments, the aerosolized high-melting-point liquid from the nebulizer; and chemically analyzing, using the one or more instruments, the aerosolized high-melting-point liquid. In one or more embodiments, the nebulizer assembly includes a nebulizer adapted to aerosolize the at least a portion of the received high-melting-point liquid, which nebulizer includes a first fluid vessel. In one or more embodiments, the nebulizer assembly further includes an evacuator adapted to receive the high-melting-point liquid from the molten liquid conduit, which evacuator includes a second fluid vessel operably coupled to the first fluid vessel of the nebulizer. In one or more embodiments, the nebulizer assembly further includes a valve operably coupled between, and in fluid communication with, the molten liquid conduit and the second fluid vessel of the evacuator; and wherein receiving, into the evacuator, the high-melting-point liquid from the molten liquid conduit includes opening the valve. In one or more embodiments, the method further includes: delivering the received high-melting-point liquid from the second fluid vessel of the evacuator into the first fluid vessel of the nebulizer. In one or more embodiments, the nebulizer assembly further includes a gas source; and wherein delivering the received high-melting-point liquid from the second fluid vessel of the evacuator into the first fluid vessel of the nebulizer includes communicating gas from the gas source into the evacuator. In one or more embodiments, the nebulizer assembly further includes a valve operably coupled between, and in fluid communication with, the first fluid vessel of the nebulizer and the second fluid vessel of the evacuator; and wherein delivering the received high-melting-point liquid from the second fluid vessel of the evacuator into the first fluid vessel of the nebulizer further includes opening the valve. In one or more embodiments, the method further includes: withdrawing a non-aerosolized portion of the high-melting-point liquid from the first fluid vessel of the nebulizer and back into the second fluid vessel of the evacuator. In one or more embodiments, the nebulizer assembly further includes a vacuum source; and wherein withdrawing the non-aerosolized portion of the high-melting-point liquid from the first fluid vessel of the nebulizer and back into the second fluid vessel of the evacuator includes applying, to the evacuator, decreased or negative gas pressure from the vacuum source. In one or more embodiments, the nebulizer assembly further includes a valve operably coupled between, and in fluid communication with, the first fluid vessel of the nebulizer and the second fluid vessel of the evacuator; and wherein withdrawing the non-aerosolized portion of the high-melting-point liquid from the first fluid vessel of the nebulizer and back into the second fluid vessel of the evacuator further includes opening the valve. In one or more embodiments, the method further includes: delivering the withdrawn non-aerosolized portion of the high-melting-point liquid from the evacuator and back into the molten liquid conduit. In one or more embodiments, the nebulizer assembly further includes a gas source; and wherein delivering the withdrawn non-aerosolized portion of the high-melting-point liquid from the evacuator and back into the molten liquid conduit includes communicating gas from the gas source into the evacuator. In one or more embodiments, the nebulizer assembly further includes a valve operably coupled between, and in fluid communication with, the second fluid vessel of the evacuator and the molten liquid conduit; and wherein delivering the withdrawn non-aerosolized portion of the high-melting-point liquid from the evacuator and back into the molten liquid conduit further includes opening the valve. In one or more embodiments, the nebulizer assembly includes: a nebulizer adapted to aerosolize the at least a portion of the received high-melting-point liquid, which nebulizer includes a vibrating mesh mounted to a vibration source; and a power source operably coupled to, and adapted to electrify, the vibration source; wherein aerosolizing the at least a portion of the received high-melting-point liquid includes electrifying, using the power source, the vibration source to thereby cause the vibration source to vibrate. In one or more embodiments, the nebulizer assembly further includes a gas source; and wherein delivering, into the one or more instruments, the aerosolized high-melting-point liquid from the nebulizer includes communicating gas from the gas source into the nebulizer.

It is understood that variations may be made in the foregoing without departing from the scope of the present disclosure.

In several embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down,"

etc., are for the purpose of illustration only and do not limit the specific orientation or location of the structure described above.

In several embodiments, while different steps, processes, and procedures are described as appearing as distinct acts, one or more of the steps, one or more of the processes, and/or one or more of the procedures may also be performed in different orders, simultaneously and/or sequentially. In several embodiments, the steps, processes, and/or procedures may be merged into one or more steps, processes and/or procedures.

In several embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. A nebulizer assembly for a molten salt flow, the nebulizer assembly comprising a heater; and a nebulizer, contained within the heater, and configured to aerosolize at least a portion of a molten salt of the molten salt flow and deliver the aerosolized molten salt to one or more instruments adapted to chemically analyze the aerosolized molten salt, wherein the nebulizer comprises a nebulizer vessel in which the nebulizer is adapted to aerosolize the portion of the molten salt, wherein the nebulizer vessel comprises a jar having an internal cavity, and a lid mated with the jar to seal the internal cavity, and the nebulizer is adapted to aerosolize the portion of the molten salt within the internal cavity, further comprising a first tube configured to deliver the portion of the molten salt to the internal cavity, a second tube configured to deliver a flow of inert gas to the internal cavity, and a third tube configured to deliver the aerosolized molten salt from the internal cavity to the one or more instruments.

2. The nebulizer assembly of claim 1, wherein the nebulizer assembly further comprises a jet piece affixed to an end of the second tube within the internal cavity, and the jet piece is configured to deliver a flow of inert gas to the internal cavity at an elevation above the surface of the molten salt held therein.

3. The nebulizer assembly of claim 2, wherein the jet comprises a set of evenly distributed spray holes.

4. The nebulizer assembly of claim 1, wherein a diameter of the third tube is greater than a diameter of either of the first tube or the second tube.

5. The nebulizer assembly of claim 1, wherein an end of the first tube within the internal cavity is arranged elevationally below an end of the second tube within the internal cavity, and the end of the second tube within the internal cavity is arranged elevationally below an end of the third tube.

6. A nebulizer assembly for a molten salt flow, the nebulizer assembly comprising a heater; and a nebulizer, contained within the heater, and configured to aerosolize at least a portion of a molten salt of the molten salt flow and deliver the aerosolized molten salt to one or more instruments adapted to chemically analyze the aerosolized molten salt, further comprising an evacuator, contained with the heater, and configured to draw the portion of the molten salt from the molten salt flow and deliver the molten salt to the nebulizer.

7. The nebulizer assembly of claim 6, wherein the nebulizer assembly further comprises a gas source adapted to communicate gas into the evacuator.

8. The nebulizer assembly of claim 7, wherein the nebulizer assembly is configured to manipulate a pressure of the gas source relative to the evacuator.

9. A method comprising receiving, into a nebulizer assembly, a molten salt, the nebulizer assembly comprising a heater, and a nebulizer, contained within the heater, and configured to aerosolize at least a portion of the molten salt of the molten salt flow and deliver the aerosolized molten salt to one or more instruments adapted to chemically analyze the aerosolized molten salt; and aerosolizing, using the nebulizer assembly, at least a portion of the received molten salt, wherein the nebulizer assembly further comprises a heat exchanger, contained with the heater, and configured to provide a heated gas flow to the nebulizer within the heater, and the method further comprises, heating, using the heater, an evacuator, the nebulizer, and the heat exchanger, and keeping the received liquid from freezing.

10. The method of claim 9, further comprising delivering, into one or more instruments, the aerosolized molten salt from the nebulizer.

11. The method of claim 10, further comprising chemically analyzing, using the one or more instruments, the aerosolized molten salt.

* * * * *